US012666003B2

(12) United States Patent
Bordes et al.

(10) Patent No.: US 12,666,003 B2
(45) Date of Patent: Jun. 23, 2026

(54) ENCODING AND DECODING METHODS AND APPARATUS

(71) Applicant: INTERDIGITAL CE PATENT HOLDINGS, SAS, Paris (FR)

(72) Inventors: Philippe Bordes, Laille (FR); Tangi Poirier, Thorigné-Fouillard (FR); Antoine Robert, Mézières sur Couesnon (FR); Fabrice Leleannec, Betton (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 310 days.

(21) Appl. No.: 17/774,789

(22) PCT Filed: Nov. 2, 2020

(86) PCT No.: PCT/EP2020/080631
§ 371 (c)(1),
(2) Date: May 5, 2022

(87) PCT Pub. No.: WO2021/089455
PCT Pub. Date: May 14, 2021

(65) Prior Publication Data
US 2022/0408082 A1      Dec. 22, 2022

(30) Foreign Application Priority Data

| | | |
|---|---|---|
| Nov. 7, 2019 | (EP) | 19306440 |
| Dec. 2, 2019 | (EP) | 19306543 |
| Dec. 30, 2019 | (EP) | 19306784 |

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/70* (2014.11)

(58) Field of Classification Search
CPC .. H04N 19/105; H04N 19/109; H04N 19/132; H04N 19/157; H04N 19/174;
(Continued)

(56) References Cited

U.S. PATENT DOCUMENTS

| | | | |
|---|---|---|---|
| 2010/0118943 A1 | 5/2010 | Shiodera et al. | |
| 2013/0142447 A1 | 6/2013 | Park et al. | |
| (Continued) | | | |

FOREIGN PATENT DOCUMENTS

| | | |
|---|---|---|
| CN | 105493505 A | 4/2016 |
| CN | 107105251 A | 8/2017 |
| (Continued) | | |

OTHER PUBLICATIONS

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Oct. 2014, pp. 1-540.
(Continued)

*Primary Examiner* — Maria E Vazquez Colon
(74) *Attorney, Agent, or Firm* — Condo Roccia Koptiw LLP

(57) ABSTRACT
A method for decoding or encoding comprising: determining if an inter prediction mode called weighted prediction is enabled for a current block; and, if weighted prediction is enabled, modifying a part of a reconstruction process of said current block related to the weighted prediction and/or to at least another prediction tool of a first set of prediction tools, the first set comprising a triangle prediction mode, a geo-
(Continued)

metrical prediction mode, a local illumination compensation mode, a combined intra inter prediction mode, and modes in which motion information used for motion compensation may be refined based on an optical flow model.

14 Claims, 9 Drawing Sheets

(51) Int. Cl.
  H04N 19/176 (2014.01)
  H04N 19/70 (2014.01)

(58) Field of Classification Search
  CPC .. H04N 19/176; H04N 19/537; H04N 19/577;
                                   H04N 19/70
  See application file for complete search history.

(56) References Cited

U.S. PATENT DOCUMENTS

| | | | |
|---|---|---|---|
| 2017/0041602 A1 | 2/2017 | Oh et al. | |
| 2017/0142418 A1 | 5/2017 | Li et al. | |
| 2019/0335200 A1 | 10/2019 | Xu et al. | |
| 2021/0235074 A1* | 7/2021 | Liu | H04N 19/52 |
| 2022/0239937 A1* | 7/2022 | Park | H04N 19/176 |
| 2022/0248044 A1* | 8/2022 | Chen | H04N 19/186 |

FOREIGN PATENT DOCUMENTS

| | | |
|---|---|---|
| GB | 2526337 A | 11/2015 |
| WO | 2017-016468 A1 | 2/2017 |
| WO | 2021034123 A1 | 2/2021 |

OTHER PUBLICATIONS

Chen et al., "Algorithm Description of Joint Exploration Test Model 7 (JEM 7)", Joint Video Exploration Team (JVET) of ITU-T SG 16 WP3 and ISO/IEC JTC 1/SC 29/WG 11, Document: JVET-G1001-v1, 7th Meeting, Torino, Italy, Jul. 13, 2017, 50 pages.

Chiang et al, "CE10.1: Combined and multi-hypothesis prediction", Joint Video Experts Team (JVET) of ITU-T SG16 WP3 and ISO/IEC JTC 1/SC 29/WG 11, Document: JVET-K0257-v1, 11th Meeting: Ljubljana, Slovenia, Jul. 10, 2018, 6 pages.

Huang et al, "CE9-related: Disabled DMVR, BDOF and BCW for CIIP", Joint Video Experts Team (JVET) of ITU-T SG16 WP3 and ISO/IEC JTC 1/SC 29/WG 11, Document: JVET-O0681, 15th Meeting: Gothenburg, Sweden, Jul. 3, 2019, 8 pages.

Chen et al, "Generalized Bi-Prediction for Inter Coding", Joint Video Exploration Team (JVET) of ITU-T SG 16 WP 3 and ISO/IEC JTC 1/SC 29/WG 11, Document: JVET-C0047, 3rd Meeting: Geneva, Switzerland, May 26, 2016, 4 pages.

Bross et al., "Versatile Video Coding (Draft 6)", Joint Video Experts Team (JVET) of ITU-T SG 16 WP 3 and ISO/IEC JTC 1/SC 29/WG 11, Document: JVET-02001-vE, 15th Meeting: Gothenburg, Sweden, Jul. 3-12, 2019, 455 pages.

Filippov et al, "Non-CE4: On TPM merge mode in the presence of weighted prediction", Joint Video Experts Team (JVET) of ITU-T SG 16 WP 3 and ISO/IEC JTC 1/SC 29/WG 11, Document: JVET-P0617-v1, 16th Meeting: Geneva, Switzerland, Oct. 3, 2019, 10 pages.

Ye et al, "AHG13: On bi-prediction with weighted averaging and weighted prediction", Joint Video Experts Team of ITU-T Sg 16WP3 and ISO/IEC JTC 29/WG11; 13th Meeting: Marrakech, Morocco, Jan. 9, 2019, Document: JVET-M0111-v1, 6 pages.

Gao et al., "CE4: CE4-1.7, CE4-1.8: GEO and TPM Blending Off for SCC", Joint Video Experts Team (JVET) of ITU-T SG 16 WP 3 and ISO/IEC JTC 1/SC 29/WG 11, Document JVET_P0069-v2, 16th Meeting: Geneva, Switzerland, Oct. 1, 2019, 4 pages.

T-D Chuang et al, "CE4-related: PROF prediction sample range reduction", Joint Video Experts Team (JVET) of ITU-T SG 16 WP 3 and ISO/IEC JTC 1/SC 29/WG 11, Document JVET_P00154-v4, 16th Meeting: Geneva, Switzerland, Oct. 1, 2019, 8 pages.

Alexander et al, "Bi-directional Optical Flow for Future Video Codec", Institute of Electrical and Electronics Engineers (IEEE), 2016 Data Compression Conference (DCC), SnowBird, Utah, USA, Mar. 30, 2016, 8 pages.

Gao et al., "Simplified GEO without Multiplication and Minimum Blending Mask Storage (harmonization of JVET-P0107, JVET-P0264 and JVET-P0304)", Joint Video Experts Team (JVET) of ITU-T SG 16 WP 3 and ISO/IEC JTC 1/SC 29/WG 11, Document: JVET_P0884, 16th Meeting: Geneva, Switzerland, Oct. 1, 2019, 6 pages.

* cited by examiner

Fig. 5A                                              Fig. 5B

ENCODING AND DECODING METHODS AND APPARATUS

CROSS REFERENCE TO RELATED APPLICATIONS

This application is a U.S. National Stage Application under 35 U.S.C. 371 of International Patent Application No. PCT/EP2020/080631, filed Nov. 2, 2020, which is incorporated herein by reference in its entirety.

This application claims the benefit of European Patent Application No. 19306440.9, filed Nov. 7, 2019; European Patent Application No. 19306543.0, filed Dec. 2, 2019; and European Patent Application No. 19306784.0, filed Dec. 30, 2019, each of which is incorporated herein by reference in its entirety.

1. TECHNICAL FIELD

At least one of the present embodiments generally relates to a method and an apparatus for video encoding or decoding, and more particularly, to a method and an apparatus for video encoding or decoding using a prediction samples weighting process or motion information refinement process based on optical flow.

2. BACKGROUND

To achieve high compression efficiency, video coding schemes usually employ predictions and transforms to leverage spatial and temporal redundancies in a video content. During an encoding, images of the video content are divided into blocks of pixels, these blocks being then partitioned into one or more sub-blocks, called original sub-blocks in the following. An intra or inter prediction is then applied to each sub-block to exploit intra or inter image correlations. Whatever the prediction method used (intra or inter), a predictor sub-block is determined for each original sub-block. Then, a sub-block representing a difference between the original sub-block and the predictor sub-block, often denoted as a prediction error sub-block or prediction residual sub-block, is transformed, quantized and entropy coded to generate an encoded video stream. To reconstruct the video, the compressed data is decoded by inverse processes corresponding to the transform, quantization and entropic coding.

In the international standard entitled Versatile Video Coding (VVC) under development by a joint collaborative team of ITU-T and ISO/IEC experts known as the Joint Video Experts Team (JVET), new compression tools have been introduced. For instance, in VVC, the number of compression tools using a prediction samples weighting process, called PSW tools in the following, has slightly increased. In parallel new tools intented to apply a refinement of motion information based on an optical flow concept, called OF tools in the following, have appeared. These PSW (respectively OF) tools using a similar concept, the improvement of the compression provided by each tool taken independently do not accumulate when these tools are combined. In addition, when combined, these tools (the PSW tools and the OF tools) may have contradictory effects and therefore, there combination could lead to a decrease of the compression efficiency.

It is desirable to propose solutions allowing avoiding combinations of incompatible PSW and/or OF tools. It is also desirable to propose solutions that avoids jointly using PSW and/or OF tools while using only one of these tools would lead to a similar compression efficiency but with a reduced encoding/decoding complexity, or when the combining of PSW and/or OF tools would lead to unacceptable complexity.

3. BRIEF SUMMARY

In a first aspect, one or more of the present embodiments provide a method for decoding comprising:
- determining, from an encoded video stream, if an inter prediction mode called weighted prediction, in which a residual block is computed as a difference between a current block and either a weighted version of a reference block in case of mono-directional inter prediction or a weighted average of the two reference blocks in case of bi-directional inter prediction, is enabled for the current block; and,
- if weighted prediction is enabled, modifying a part of a reconstruction process of said current block related to the weighted prediction and/or to at least another prediction tool of a first set of prediction tools, the first set comprising a triangle prediction mode, a geometrical prediction mode, a local illumination compensation mode, a combined intra inter prediction mode, and modes in which motion information used for motion compensation are refined based on an optical flow model.

In a second aspect, one or more of the present embodiments provide a device for decoding comprising:
- means for determining, from an encoded video stream, if an inter prediction mode called weighted prediction, in which a residual block is computed as a difference between a current block and either a weighted version of a reference block in case of mono-directional inter prediction or a weighted average of the two reference blocks in case of bi-directional inter prediction, is enabled for the current block; and,
- a modification means, applied if weighted prediction is enabled, modifying a part of a reconstruction process of said current block related to the weighted prediction and/or to at least another prediction tool of a first set of prediction tools, the first set comprising a triangle prediction mode, a geometrical prediction mode, a local illumination compensation mode, a combined intra inter prediction mode, and modes in which motion information used for motion compensation are refined based on an optical flow model.

In an embodiment, weighted prediction is enabled when at least one weight used by weighted prediction mentioned in a slice header of a slice comprising the current block is different from a default weight.

In an embodiment, the reconstruction process of the current block is modified by preventing parsing or inferring from the encoded video stream any syntax element related to a tool of the first set for said current block.

In an embodiment, weighted prediction is enabled when a reference image providing a reference block for inter prediction of the current block is associated to a weight different from a default weight.

In an embodiment, determining that weighted prediction is enabled for the current block comprises parsing or inferring syntax elements related to a tool of the first set in a bitstream portion of the encoded video stream representative of the current block.

In an embodiment, the reconstruction process of the current block is modified by preventing an application of a tool of the first set even though syntax elements of the encoded video stream related to said tool of the first set indicates that said tool of the first set needs to be applied to the current block.

In an embodiment, the reconstruction process of the current block is modified by replacing an application of a tool of the first set to the current block specified in the encoded video stream by an application of an alternative inter prediction tool.

In an embodiment, the reconstruction process of the current block is modified by changing an interpretation of a syntax element related to a tool of the first set by changing a semantic of said syntax element.

In an embodiment, the reconstruction process of the current block is modified by changing an order of execution of weighted prediction and of a tool of the first set.

In an embodiment, the reconstruction process of the current block is modified by mixing the weighted prediction and at least one tool of the first set into a single weighting stage.

In a third aspect, one or more of the present embodiments provide a method for encoding in an encoded video stream a bitstream portion representative of a current block comprising:

determining if an inter prediction mode called weighted prediction, in which a residual block is computed as a difference between the current block and either a weighted version of a reference block in case of mono-directional inter prediction or a weighted average of the two reference blocks in case of bi-directional inter prediction, is enabled for the current block; and, if weighted prediction is enabled, modifying a part of an encoding process of said current block related to the weighted prediction and/or to at least another prediction tool of a first set of prediction tools, the first set comprising a triangle prediction mode, a geometrical prediction mode, a local illumination compensation mode, a combined intra inter prediction mode, and modes in which motion information used for motion compensation may be refined based on an optical flow model.

In a fourth aspect, one or more of the present embodiments provide a device for encoding in an encoded video stream a bitstream portion representative of a current block comprising:

means for determining if an inter prediction mode called weighted prediction, in which a residual block is computed as a difference between the current block and either a weighted version of a reference block in case of mono-directional inter prediction or a weighted average of the two reference blocks in case of bi-directional inter prediction, is enabled for the current block; and, a modification means, applied if weighted prediction is enabled, modifying a part of a reconstruction process of said current block related to the weighted prediction and/or to at least another prediction tool of a first set of prediction tools, the first set comprising a triangle prediction mode, a geometrical prediction mode, a local illumination compensation mode, a combined intra inter prediction mode, and modes in which motion information used for motion compensation may be refined based on an optical flow model.

In an embodiment, weighted prediction is enabled when at least one weight used by weighted prediction encoded in a slice header of a slice comprising the current block is different from a default weight.

In an embodiment, the reconstruction process of the current block is modified by preventing any use of a prediction tool of the first set, the bitstream portion of the encoded video stream representative of the current block comprising no syntax element related to a prediction tool of the first set.

In an embodiment, weighted prediction is enabled when a reference image providing a reference block for inter prediction of the current block is associated to a weight different from a default weight.

In an embodiment, the reconstruction process of the current block is modified by reconstructing the current block without applying a prediction tool of the first set selected for encoding the current block, syntax elements representative of the selected prediction tool of the first set being encoded in the bitstream portion of the encoded video stream representative of the current block.

In an embodiment, the reconstruction process of the current block is modified by reconstructing the current block by replacing a prediction tool of the first set selected for encoding the current block by an alternative inter prediction tool, syntax elements representative of the selected prediction tool of the first set being encoded in the bitstream portion of the encoded video stream representative of the current block.

In an embodiment, the reconstruction process of the current block is modified by modifying an order of application of the weighted prediction and of a tool of the first set.

In an embodiment, the reconstruction process of the current block is modified by mixing the weighted prediction and at least one tool of the first set into a single weighting stage.

In a fifth aspect, one or more of the present embodiments provide an apparatus comprising a device according to the second or the fourth aspect.

In a sixth aspect, one or more of the present embodiments provide a signal comprising data generated according to the method according to the third aspect, or by the device according to the fourth aspect.

In a seventh aspect, one or more of the present embodiments provide a computer program comprising program code instructions for implementing the decoding method according to first aspect or for implementing the encoding method third aspect.

In an eighth aspect, one or more of the present embodiments provide an information storage means storing program code instructions for implementing the decoding method according to first aspect or for implementing the encoding method third aspect.

4. BRIEF SUMMARY OF THE DRAWINGS

FIG. 5A illustrates schematically an embodiment of a triangle prediction mode;

FIG. 5B illustrates schematically an embodiment of a geometrical prediction mode;

Figure 9:
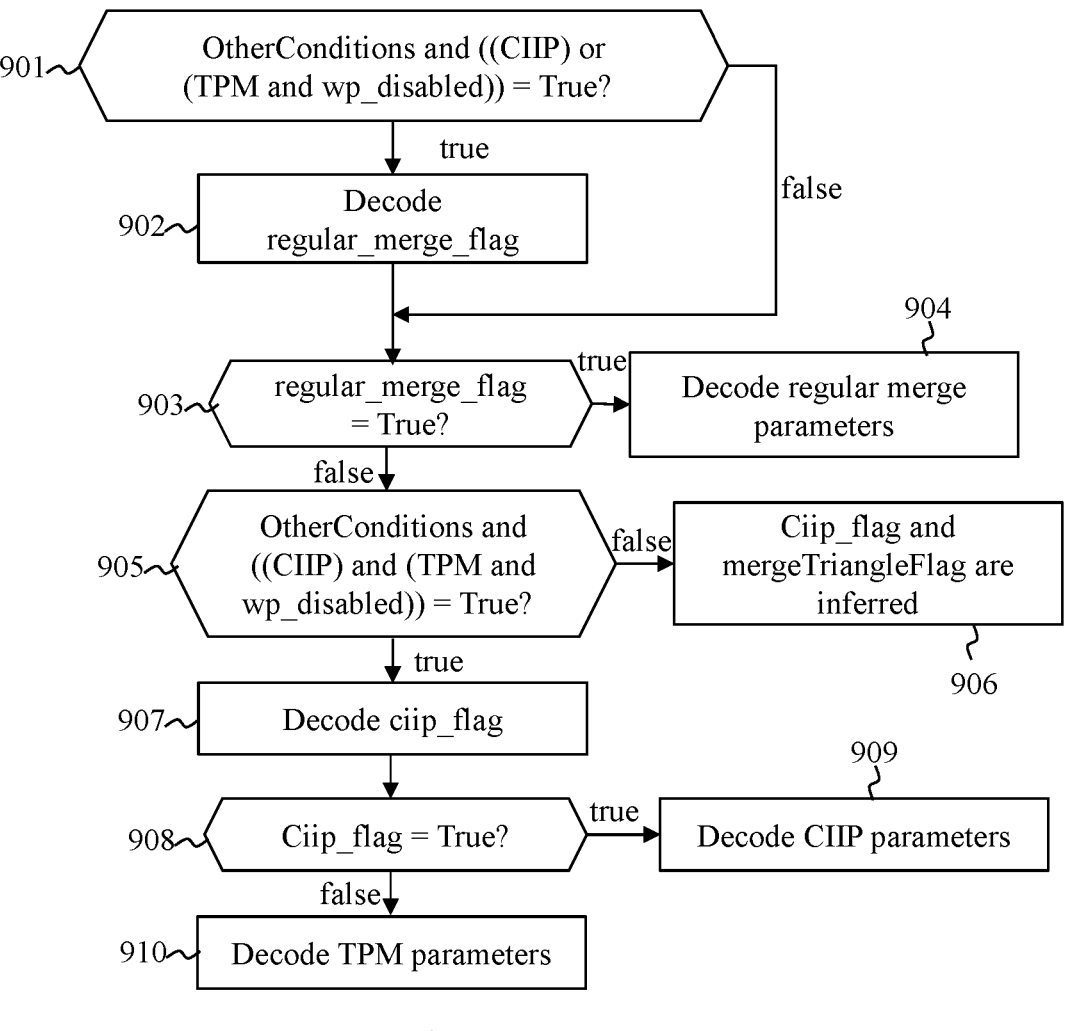
Figures 10, 11:
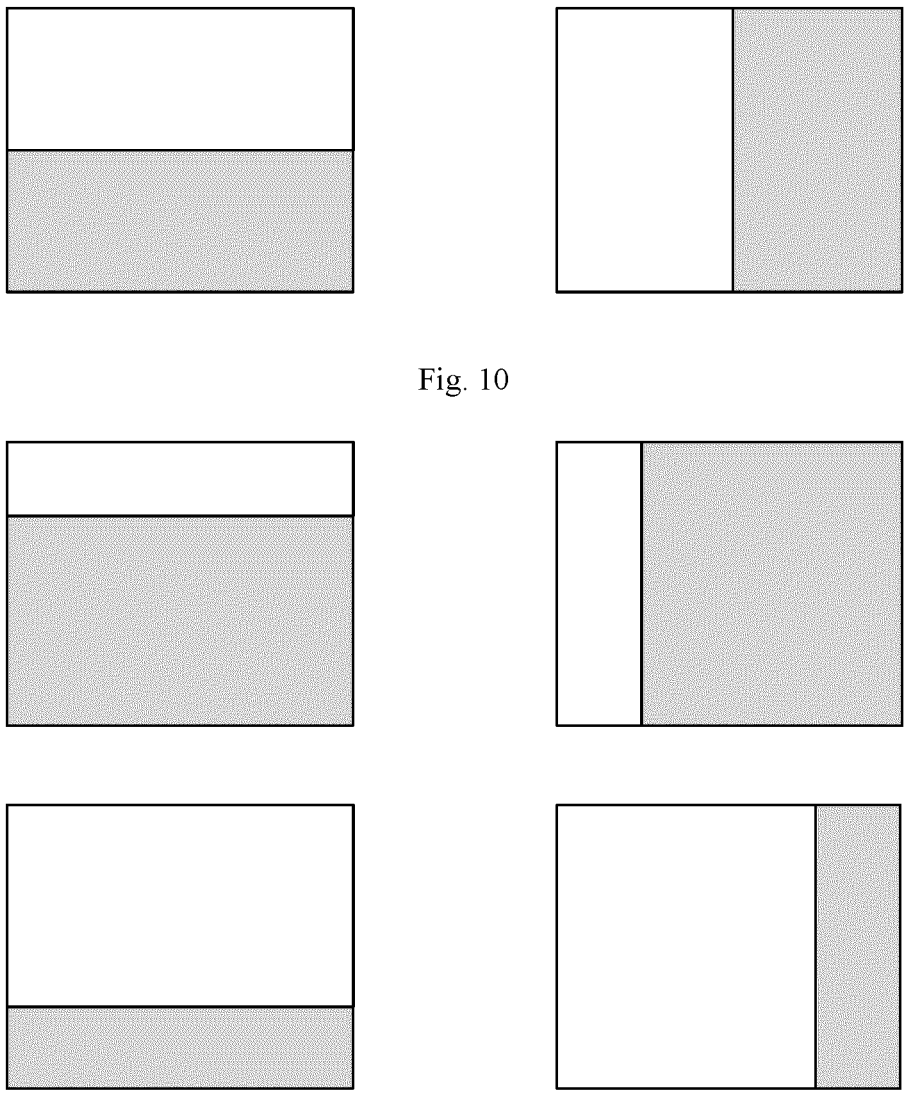
Figure 12:
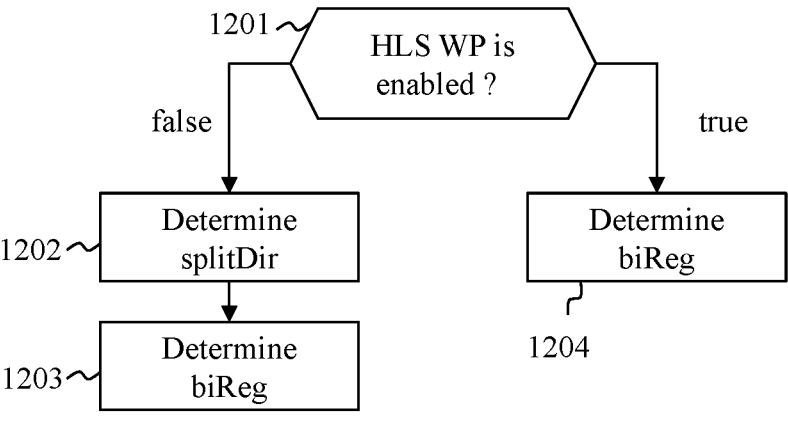
Figure 13:
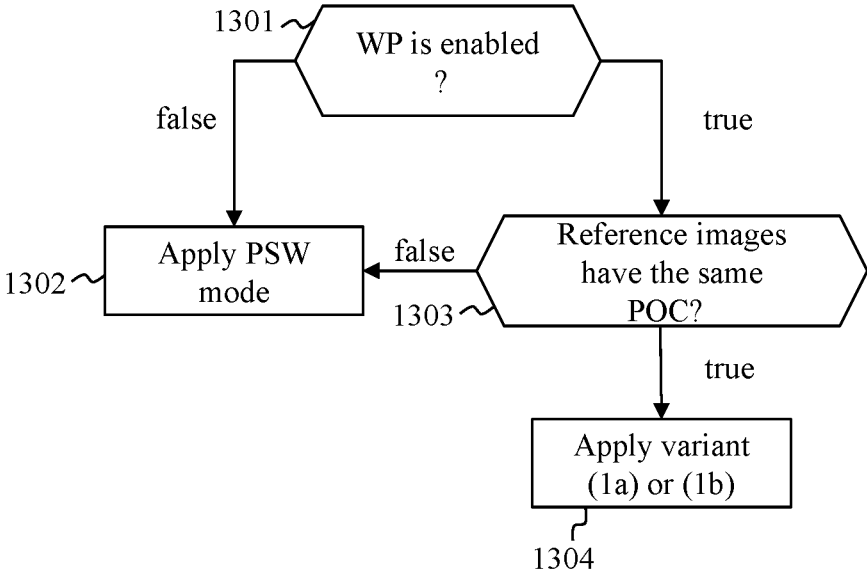

FIG. 9 discloses a modified part of a reconstruction process;

FIG. 10 illustrates schematically examples of partitioning of a block in two sub-blocks of equal sizes;

FIG. 11 illustrates schematically examples of partitioning of a block in two sub-blocks of unequal sizes;

FIG. 12 represents schematically a parsing process corresponding to an example of deactivation of a PSW or OF tool comprising not applying the regular reconstruction process for said PSW or OF tool; and, FIG. 13 represents schematically a reconstruction process corresponding to an example of deactivation of a PSW or OF tool comprising not applying the regular reconstruction process for said PSW or OF tool.

5. DETAILED DESCRIPTION

The following description of embodiments is done in the context of VVC. However, these embodiments are not limited to the video coding/decoding method corresponding to VVC and applies to other video coding/decoding methods, but also to other image coding/decoding methods in which PSW and/or OF tools are used and could be combined.

At least one of the following embodiments allow preventing combining incompatible PSW and/or OF tools.

At least one of the following embodiments allows reducing the complexity of an encoding and/or a decoding process by preventing combinations of PSW and/or OF tools the combination of which doesn't lead to a sufficient compression gain or leading to unacceptable complexity.

Figure 1:
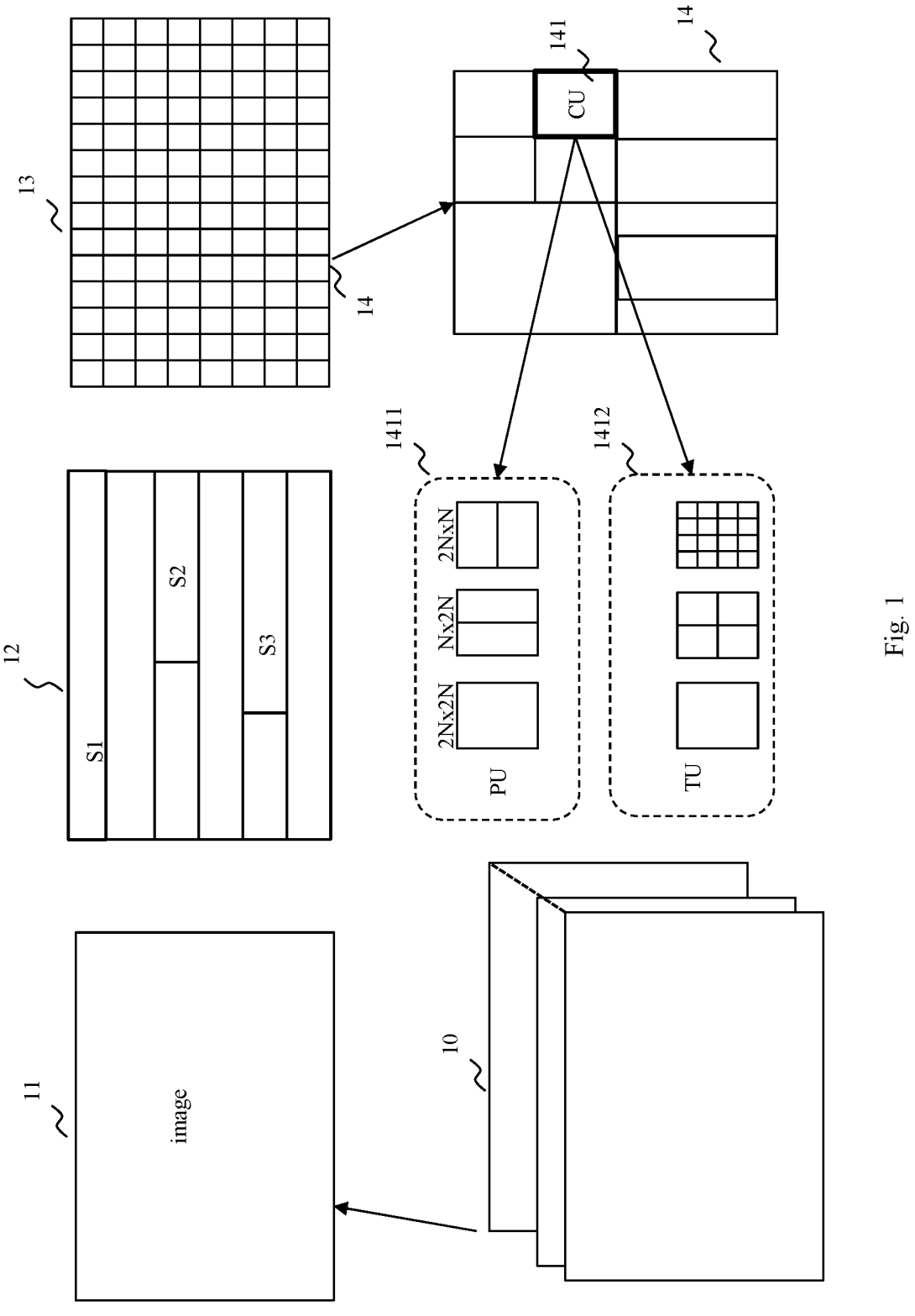
FIG. 1 illustrates an example of partitioning undergone by an image of pixels of an original video.

FIG. 1 illustrates an example of partitioning undergone by an image of pixels 11 of an original video 10. It is considered here that a pixel is composed of three components: a luminance component and two chrominance components. However, the following embodiments are adapted to images constituted of pixels comprising another number of components, for instance grey level images wherein pixels comprise one component, or images constituted of pixels comprising three color components and a transparency component and/or a depth component.

An image is divided into a plurality of coding entities. First, as represented by reference 13 in FIG. 1, in VVC, an image is divided in a grid of blocks called coding tree units (CTU). A CTU consists of an N×N block of luminance samples together with two corresponding blocks of chrominance samples. N is generally a power of two having a maximum value of "128" for example. Second, an image is divided into one or more group of CTU. For example, it can be divided into one or more tile rows and tile columns, a tile being a sequence of CTU covering a rectangular region of an image. In some cases, a tile could be divided into one or more bricks, each of which consisting of at least one row of CTU within the tile. Above the concept of tiles and bricks, another encoding entity, called slice, exists, that can contain at least one tile of an image or at least one brick of a tile.

Two modes of slices are supported, namely the raster-scan slice mode and the rectangular slice mode. In the raster-scan slice mode, a slice contains a sequence of tiles in a tile raster scan of an image. In the rectangular slice mode, a slice contains at least one brick of an image forming a rectangular region of the image. The bricks within a rectangular slice are in the order of brick raster scan of the slice.

In the example in FIG. 1, as represented by reference 12, the image 11 is divided into three slices S1, S2 and S3 of the raster-scan slice mode, each comprising a plurality of tiles (not represented), each tile comprising only one brick.

As represented by reference 14 in FIG. 1, a CTU may be partitioned into the form of a hierarchical tree of one or more sub-blocks called coding units (CU). The CTU is the root (i.e. the parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned. While the standard HEVC (ISO/IEC 23008-2—MPEG-H Part 2, High Efficiency Video Coding/ITU-T H.265) was using only one type of hierarchical tree called quadtree, VVC allows hierarchical trees mixing a plurality of types of hierarchical trees comprising the quadtree, a binary tree and a ternary tree. In a quadtree, a CTU (respectively a CU) can be partitioned in (i.e. can be the parent node of) "4" square CU of equal sizes. In a binary tree, a CTU (respectively a CU) can be partitioned horizontally or vertically in "2" rectangular CU of equal sizes. In a ternary tree, a CTU (respectively a CU) can be partitioned horizontally or vertically in "3" rectangular CU. For instance a CU of height N and width M is vertically (respectively horizontally) partitioned in a first CU of height N (resp. N/4) and width M/4 (resp. M), a second CU of height N (resp. N/2) and width M/2 (resp. M), and a third CU of height N (resp. N/4) and width M/4 (resp. M).

In the example of FIG. 1, the CTU 14 is first partitioned in "4" square CU using a quadtree type partitioning. The upper left CU is a leaf of the hierarchical tree since it is not further partitioned, i.e. it is not a parent node of any other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of an image, the partitioning is adaptive, each CTU being partitioned so as to optimize a compression efficiency of the CTU criterion.

In HEVC appeared the concept of prediction unit (PU) and transform unit (TU). Indeed, in HEVC, the coding entity that is used for prediction (i.e. a PU) and transform (i.e. a TU) can be a subdivision of a CU. For example, as represented in FIG. 1, a CU of size 2N×2N, can be divided in PU 1411 of size N×2N or of size 2N×N. In addition, said CU can be divided in "4" TU 1412 of size N×N or in "16" TU of size $$\left(\frac{N}{2}\right) \times \left(\frac{N}{2}\right).$$

One can note that in VVC, except in some particular cases, frontiers of the TU and PU are aligned on the frontiers of the CU. Consequently, a CU comprises generally one TU and one PU. Some PSW tools allow partitioning a CU in a plurality of PU. For example, a prediction mode called Triangle Prediction Mode (TPM) allows partitioning a CU into two triangular PU of equal sizes. FIG. 5A represents two PU obtained by partitioning a rectangular CU according to the TPM mode. While the TPM mode allows partitioning a CU into two triangular PU of equal size, a second mode called Geometrical prediction mode (GEO) allows partitioning a CU into two PU of unequal sizes. FIG. 5B represents a rectangular CU partitioned in two PU according to the GEO mode.

In the present application, the term "block" or "image block" can be used to refer to any one of a CTU, a CU, a PU and a TU. In addition, the term "block" or "image block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture", "sub-picture", "slice" and "frame" may be used interchangeably. Usually, but not necessarily, the term "reconstructed" is used at the encoder side while "decoded" is used at the decoder side.

Figure 2:
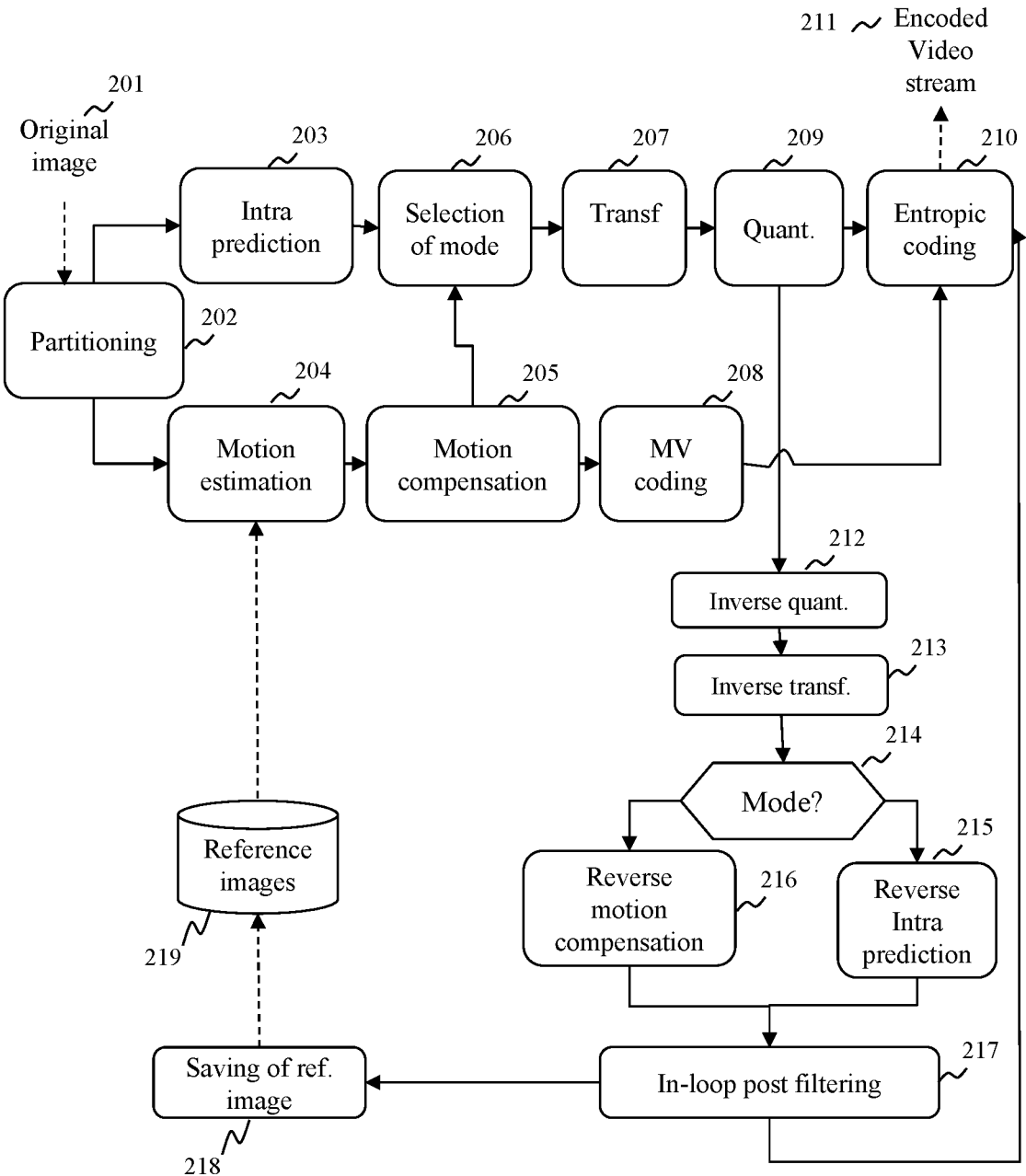
FIG. 2 depicts schematically a method for encoding a video stream.

FIG. 2 depicts schematically a method for encoding a video stream executed by an encoding module. Variations of this method for encoding are contemplated, but the method for encoding of FIG. 2 is described below for purposes of clarity without describing all expected variations.

Before being encoded, a current original image 201 of a video may go through pre-encoding processing (not represented in FIG. 2). For example, a color transform is applied to the current original image (e.g., conversion from RGB 4:4:4 to YCbCr 4:2:0), or a remapping is applied to the current original image 201 components in order to get a signal distribution more resilient to compression (for instance using a histogram equalization of one of the color components).

The encoding of the current original image 201 begins with a partitioning of the current original image 201 during a step 202, as described in relation to FIG. 1. The current image 201 is thus partitioned into CTU, CU, PU, TU, etc. For each block, the encoding module determines a coding mode between an intra prediction and an inter prediction.

The intra prediction consists of predicting, in accordance with an intra prediction method, during a step 203, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of an image preceding or following the current image, this image being referred to as the reference image. During the coding of a current block in accordance with the inter prediction method, a block of the reference image closest, in accordance with a similarity criterion, to the current block is determined by a motion estimation step 204. During step 204, a motion vector indicating the position of the reference block in the reference image is determined. Said motion vector is used during a motion compensation step 205 during which a residual block is calculated in the form of a difference between the current block and the reference block.

In the first video compression standards, the mono-directional inter prediction mode described above was the only inter mode available. As video compression standards evolve, the family of inter modes has grown significantly and comprises now many different inter modes.

A first evolution of the inter mode was the bi-directional inter prediction (or B mode). In the B mode a current block is associated with two motion vectors, designating two reference blocks in two different images. The predictor block allowing to compute the residual block for the current block is an average of two reference blocks. Said predictor biPred for the current block is computed as follows:

$$biPred = (w_0 \cdot pred_0 + w_1 \cdot pred_1 + 1)/2 \qquad (1)$$

where $pred_0$ is a motion compensated block predictor taken in a list L0 of reference images stored in a buffer of decoded images, called generally Decoded Picture Buffer (DPB); $pred_1$ is a motion compensated block predictor taken in a list L1 of reference images stored in the DPB; $w_0$ and $w_1$ are weights equal to one in the case of bi-directional inter prediction.

Several generalizations of bi-directional inter prediction were proposed in which the weights $w_0$ and $w_1$ can be different. weighted prediction (WP) could be considered as a generalization of bi-directional inter predictions on some aspects. In WP, the residual block is computed as a difference between the current block and either a weighted version of a reference block in case of mono-directional inter prediction or a weighted average of two reference blocks in case of bi-directional inter prediction. WP could be generalized so that the residual block is computed as a difference between the current block and either a weighted version of a reference block or a weighted average of a plurality of reference blocks. WP could be enabled at the sequence level in a sequence header (called sequence parameter set (SPS) in VVC) or image level in an image header (called picture parameter set (PPS) in VVC) or slice level in a slice header. WP defines weights $w_i$ and offsets $off_i$ per group of CTU (e.g. generally at a slice header level) associated to each component of each reference picture i of each list (L0 and L1) of reference images stored in the DPB. If a current block is coded in mono-directional WP, a prediction sample pred(x,y) at position (x,y) for said current block is computed as follows:

$$pred(x, y) = ((w_0 \cdot pred_0(x, y) + (1 \ll (shift - 1))) \gg shift) + Off_0$$

where $pred_0$ (x, y) is a motion compensated predictor sample taken in the list L0 of reference images stored in the DPB and spatially corresponding to pred(x, y), $w_0$ is a weight, $Off_0$ is an offset value, shift is a shift value, (y<<x) is a left shift of x bits of the binary representation of y and (y>>x) is a right shift of x bits of the binary representation of y.

If a current block is coded in bi-directional WP, the prediction sample pred(x,y) at position (x,y) for said current block is computed as follows:

$$pred(x, y) = ((w_0 \cdot pred_0(x, y) + w_1 \cdot pred_1(x, y) + \mathit{Off}_{01}) \gg (shift + 1)) \quad (2)$$

$$with \ \mathit{Off}_{01} = (\mathit{Off}_0 + \mathit{Off}_1 + 1) \ll shift$$

where $pred_1(x, y)$ is a motion compensated predictor sample taken in the list L1 of reference images stored in the DPB and spatially corresponding to pred(x, y), $w_1$ is a weight, $\mathit{Off}_i$ is an offset value.

In order to keep increased numerical precision when weighting samples, one can store and operate intermediate sample values with increased bit-depth precision. In this case, the final (desired) bit-depth sample prediction precision (bitDepth) is obtained with a last right bit-shift at the end of the prediction computation process. For example, the reference pictures in the DPB are stored at the precision bitDepth, but intermediate motion compensated samples are stored at increased precision (bitDepth+sp) in intermediate buffers. In this case, the right shift value shift in the two preceding equations may be replaced with (shift+sp) to finally re-scale the prediction sample to the precision bit-Depth. Note that similar intermediate bit-depth precision increase processes are generally used for all prediction tools using a sample weighting process.

While WP is enabled in a sequence header (SPS) and in an image header (PPS) and the associated weights and offsets are specified in a slice header, a new mode called Bi prediction with CU-level weight (BCW), allows signalling weights at the block level. When the BCW mode is applied to a current block, a predictor sample pred(x, y) for said current block is computed as follows:

$$pred(x, y) = ((8 - w) \cdot pred_0(x, y) + w \cdot pred_1(x, y) + 4) \gg 3$$

where $pred_0 (x, y)$ is a motion compensated predictor sample taken in the list L0 of reference images stored in the DPB and spatially corresponding to pred(x, y), $pred_1(x, y)$ is a motion compensated predictor sample taken in the list L1 of reference images stored in the DPB and spatially corresponding to pred (x, y), and w is a weight taken in a set of five weights (w∈ {−2, 3, 4, 5, 10}). The weight w is determined in one of two ways: 1) for a non-merge CU, a weight index bcw_idx is signalled after the motion vector difference; 2) for a merge CU, the weight index bcw_idx is inferred from neighbouring blocks based on the merge candidate index.

Figure 5C:
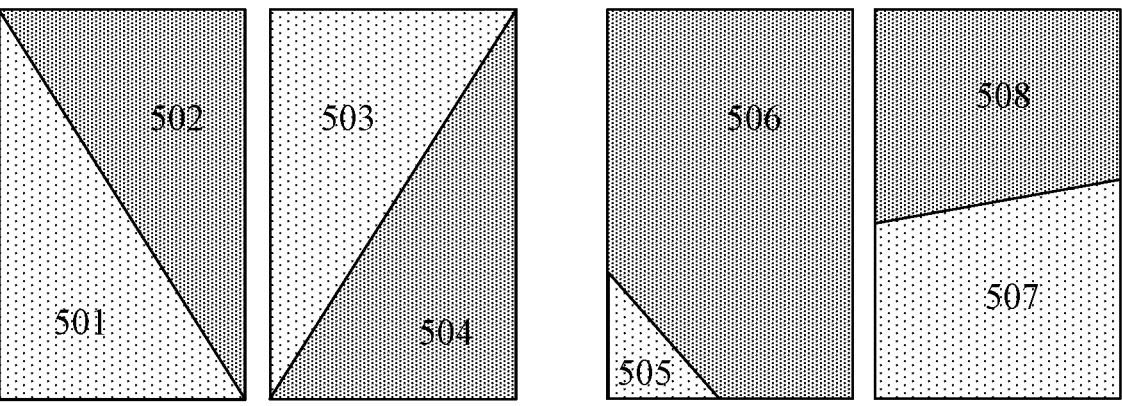
FIG. 5C illustrates schematically an adaptive weighting process applied in the triangle prediction mode.
Figure 5C:
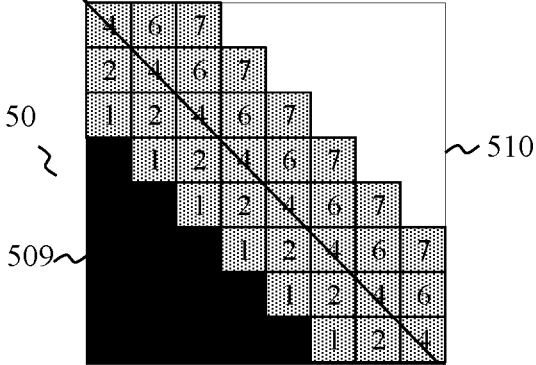

The triangle prediction mode (TPM) and the geometrical prediction mode (GEO), already presented in relation to FIGS. 5A and 5B, are particular forms of inter modes. As mentioned above, in TPM and GEO mode, a block is divided in two PU (i.e. two partitions). Information representative of the frontier separating the two PU is encoded for the current block. Said information comprises syntax elements (merge_triangle_split_dir for TPM mode or wedge_partition_idx for GEO mode) representing an edge direction (i.e. the direction and/or position of the frontier). When TPM or GEO mode is used each PU of a current block is inter-predicted using its own motion information. Only mono directional prediction is allowed for each PU. Two merge indexes (merge-idx-0 and merge-idx-1) are coded corresponding to a list of motion vector predictors candidates with associated reference indices, built from spatial and temporal neighbours (based on regular merge candidate list), from list L0 and list L1 alternatively. In the version 6.0 of the VVC standard described in document JVET-O2001, simply noted JVET-O2001 in the following, in case of TPM, the values of (merge-idx-0 and merge-idx-1) are derived from the syntax elements (merge_triangle_idx-0 and merge_triangle_idx1). In case of GEO, the values of merge-idx-O and merge-idx-1 are derived from the syntax elements wedge_partition_idx0 and wedge_partition_idx1. After predicting each of the PU, the sample values along the frontier between the two PU (for example the frontier between PU 501 and 502 in FIG. 5A) are adjusted using a blending processing with adaptive weights. FIG. 5C illustrates schematically an adaptive weighting process applied in the TPM mode. In FIG. 5C, a 8×8 block 50 encoded in TPM mode comprises two triangular partitions 509 and 510. $Pred_0$. Samples represented in black in partition 509 are integrally predicted from a predictor $Pred_0$. Samples represented in white in partition 510 are integrally predicted from a predictor $Pred_1$. Samples at the frontier between partition 509 and partition 510 are weighted averages of samples predicted from predictors $Pred_0$ and $Pred_1$, the weights applied in the weighted average depending on the position of the samples with respect to the frontier. In the example of FIG. 5C, samples with an identifier equal to "1" are computed as follows:

$$Pred(x, y) = \frac{1}{8} \cdot Pred_0(x, y) + \frac{7}{8} \cdot Pred_1(x, y)$$

where $Pred_0(x,y)$ is a sample at position (x,y) in a predictor $Pred_0$, $Pred_1(x,y)$ is a sample at position (x,y) in a predictor $Pred_1$, and the adaptive weights $$w_0^{adapt} \text{ and } w_1^{adapt}$$

equal respectively $$\frac{1}{8} \text{ and } \frac{7}{8}.$$

Samples with an identifier equal to "2" are computed as follows:

$$Pred(x, y) = \frac{2}{8} \cdot Pred_0(x, y) + \frac{6}{8} \cdot Pred_1(x, y)$$

where $$w_0^{adapt} \text{ and } w_1^{adapt}$$

equal respectively $$\frac{2}{8} \text{ and } \frac{6}{8}.$$

Samples with an identifier equal to "4" are computed as follows:

$$Pred(x, y) = \frac{4}{8} \cdot Pred_0(x, y) + \frac{4}{8} \cdot Pred_1(x, y)$$

where $$w_0^{adapt} \text{ and } w_1^{adapt}$$

equal respectively $$\frac{4}{8} \text{ and } \frac{4}{8}.$$

Samples with an identifier equal to "6" are computed as follows:

$$Pred(x, y) = \frac{6}{8} \cdot Pred_0(x, y) + \frac{2}{8} \cdot Pred_1(x, y)$$

where $$w_0^{adapt} \text{ and } w_1^{adapt}$$

equal respectively $$\frac{6}{8} \text{ and } \frac{2}{8}.$$

Samples with an identifier equal to "7" are computed as follows:

$$Pred(x, y) = \frac{7}{8} \cdot Pred_0(x, y) + \frac{1}{8} \cdot Pred_1(x, y)$$

where $$w_0^{adapt} \text{ and } w_1^{adapt}$$

equal respectively $$\frac{7}{8} \text{ and } \frac{1}{8}.$$

During the standardization process of VVC, a new inter mode, called Local Illumination compensation (LIC), intended to compensate for illumination change which may occur between a current block and its reference block in inter prediction was proposed. When this tool is activated for a current block, some prediction parameters are computed based on some reconstructed image samples, localized on the left and/or on the top of the current block and reference image samples localized on the left and/or on the top of a reference block identified by a motion vector. A LIC model based on the computed prediction parameters is then applied to the prediction samples of the reference block. A prediction sample $Pred_{corr}(x,y)$ corrected using LIC can be computed as follows:

$$Pred_{corr}(x, y) = ((a \cdot Pred(x, y) + (1 \ll (shift - 1))) \gg shift) + b$$

where $Pred_{corr}(x,y)$ is a sample at position (x,y) corrected by LIC, Pred(x,y) is a motion compensated prediction sample value at position (x,y), shift a is value of binary shift as already evocated above in relation to WP, a and b are LIC parameters.

The LIC mode may be enabled in the HLS and signalled at the block level.

New inter tools called Optical Flow Based (OF), based on the optical flow concept which assumes that the movement of an object is smooth, were also proposed to VVC. In the OF tools, motion information used for motion compensation may be refined based on an optical flow model. In VVC, the OF tools comprise a first mode called Bi-directional optical flow (BDOF) mode, a second mode called prediction refinement with optical flow (PROF) mode, and a third mode called decoder side motion refinement (DMVR). However, other OF tools exists.

BDOF is used to refine a bi-directional prediction signal of a block at a 4×4 sub-block level. For each 4×4 sub-block of a block, a motion refinement is computed by minimizing a difference between the samples of the two reference blocks used for bi-directional prediction. The motion refinement is then used to adjust the values of the samples obtained by bi-directional prediction in the 4×4 sub-blocks. To do so, a new term is added to the traditional bi-prediction $$\frac{I^0 + I^1}{2}:$$

$$pred = \frac{I^0 + I^1}{2} + \frac{\sigma / 2\left(v_x\left(I_x^0 - I_x^1\right) + v_y\left(I_y^0 - I_y^1\right)\right)}{2}$$

Where pred is a predictor sub-block, $I^0$ is a first motion compensated reference sub-block, $I^1$ is a second motion compensated reference sub-block, $$I_x^k \text{ and } I_y^k$$

are respectively horizontal and vertical gradients for the $i^{th}$ reference sub-block (k={0,1}), $(v_x, v_y)$ is a motion vector between the first reference sub-block and the second reference sub-block, $\sigma$ is a temporal difference between the image comprising the first reference sub-block and the image comprising the second reference sub-block. More details on the BDOF mode can be found in section 3.4.9 of document JVET-O2002-V1: Algorithm description for Versatile Video Coding and Test Model 6 (VTM 6), Jianle Chen, Yan Ye and Seung Hwan Kim, 15th Meeting: Gothenburg, SE, 3-12 Jul. 2019, called simply JVET-O2002 in the following.

Figure 6:
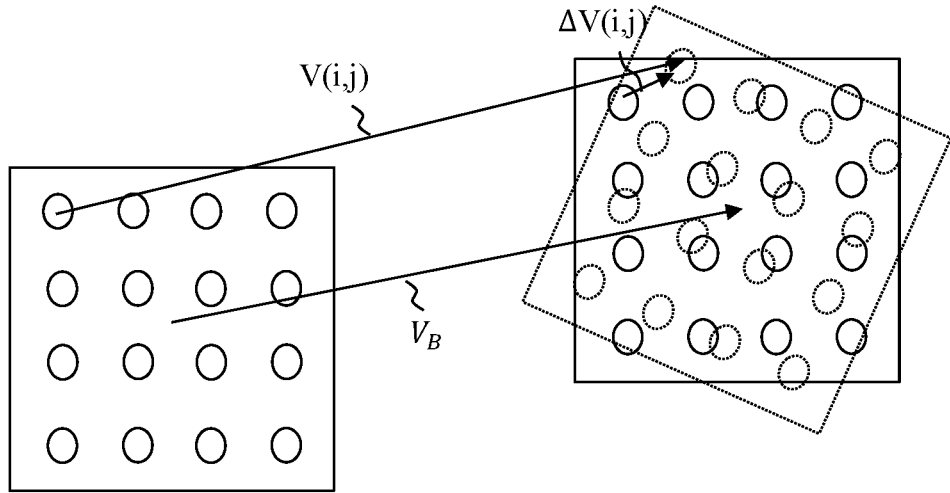
FIG. 6 represents schematically an example of application of a prediction refinement with optical flow mode.

In the PROF mode, from the optical flow model, one can derive offset corrections $\Delta I$, when a parametric motion model is known, as it is the case for the Affine motion compensation. The offset corrections $\Delta I$ are then added to prediction samples of the current block $I(i, j)$ to obtain corrected prediction samples $I'(i, j)$:

$$\Delta I(i, j) = g_x(i, j) * \Delta v_x(i, j) + g_y(i, j) * \Delta v_y(i, j)$$

$$I'(i, j) = I(i, j) + \Delta I(i, j)$$

where $g_x(i, j)$ and $g_y(i,j)$ are respectively horizontal and vertical local gradients at a position $(i,j)$ in a current image, $(\Delta v_x, \Delta v_y)$ is a difference between a motion vector $V(i,j)$ at the position $(i,j)$ computed with the parametric motion model and a motion vector $V_B$ of a block to which a sample at the position $(i,j)$ belongs to, computed with a position dependent motion model (i.e. rotation model). FIG. 6 represents schematically an example of application of the PROF mode.

Still in the context of bi-directional inter prediction, DMVR aims at refining motion vectors by testing some displacements around decoded motion vectors. A plurality of candidate motion vector pairs are tested. Each pair comprises one motion vector $MV_{refBlock\_L0}$ designating a first reference block and one motion vector $MV_{refBlock\_L1}$ designating a second reference block. The selected motion vector pair is the one which minimizes a difference between the reference block designated by the motion vector $MV_{refBlock\_L0}$ and the reference block designated by the motion vector $MV_{refBlock\_L1}$.

In VVC, a new tool called Combined Intra and Inter Prediction (CIIP) was also proposed. As its name indicates, the CIIP mode combines (blends) an inter prediction signal with an intra prediction signal. The inter prediction signal in the CIIP mode is derived using the same inter prediction process applied to the regular merge mode (i.e. derivation of motion information of a current block from a neighbouring block). The intra prediction signal is derived following the regular intra prediction process with the planar mode. Then, the intra and inter prediction signals are combined using weighted averaging, where the weight values are calculated depending on the coding modes of the top and left neighbouring blocks. More precisely, a CIIP predictor is obtained with the following formulae:

$$P_{CIIP} = (w_A \cdot P_{inter} + w_B \cdot P_{intra} + off) \gg \text{shift}$$

Where $P_{inter}$ is the inter predictor, $P_{intra}$ is the intra predictor, off and shift are respectively a constant offset and a constant shift equal to two, and $w_A$ and $w_B$ are weights depending on the coding modes of the top and left neighbouring blocks.

In the following, we consider that the BCW, TPM, GEO, CIIP, LIC modes belong to the set of PSW tools. We consider that the BDOF, PROF and DMVR modes belongs to the OF tools. Note that the names of the PSW and OF tools enumerated above are names currently used in NET-O2002 or in JVET-O2001. These names are just descriptive terms. As such, they do not preclude the use of other names for said PSW and OF tools.

During a selection step 206, the prediction mode optimising the compression performances, in accordance with a rate/distortion criterion (i.e. RDO criterion), among the prediction modes tested (Intra prediction modes, Inter prediction modes comprising for example the PSW and OF tools), is selected by the encoding module.

When the prediction mode is selected, the residual block is transformed during a step 207 and quantized during a step 209. Note that the encoding module can skip the transform and apply quantization directly to the non-transformed residual signal. When the current block is coded according to an intra prediction mode, a prediction direction and the transformed and quantized residual block are encoded by an entropic encoder during a step 210. When the current block is encoded according to an inter prediction, when appropriate, a motion vector of the block is predicted from a prediction vector selected from a set of motion vectors corresponding to reconstructed blocks situated in the vicinity of the block to be coded. The motion information is next encoded by the entropic encoder during step 210 in the form of a motion residual and an index for identifying the prediction vector. The transformed and quantized residual block is encoded by the entropic encoder during step 210. Note that the encoding module can bypass both transform and quantization, i.e., the entropic encoding is applied on the residual without the application of the transform or quantization processes. The result of the entropic encoding is inserted in an encoded video stream 211. Metadata can be attached to the encoded video stream 211.

After the quantization step 209, the current block is reconstructed so that the pixels corresponding to that block can be used for future predictions. This reconstruction phase is also referred to as a prediction loop. An inverse quantization is therefore applied to the transformed and quantized residual block during a step 212 and an inverse transformation is applied during a step 213. According to the prediction mode used for the block obtained during a step 214, the prediction block of the block is reconstructed. If the current block is encoded according to an inter prediction mode, the encoding module applies, when appropriate, during a step 216, a motion compensation using the motion vector of the current block in order to identify the reference block of the current block. If the current block is encoded according to an intra prediction mode, during a step 215, the prediction direction corresponding to the current block is used for reconstructing the reference block of the current block. The reference block and the reconstructed residual block are added in order to obtain the reconstructed current block.

Following the reconstruction, an in-loop post-filtering intended to reduce the encoding artefacts is applied, during a step 217, to the reconstructed block. This post-filtering is called in-loop post-filtering since this post-filtering occurs in the prediction loop to obtain at the encoder the same reference images as the decoder and thus avoid a drift between the encoding and the decoding processes. For instance, in HEVC, the in-loop post-filtering comprises a deblocking filtering and a SAO (sample adaptive offset) filtering. Parameters representative of the activation or the deactivation of the in-loop deblocking filter and when activated, of characteristics of said in-loop deblocking filter are introduced in the encoded video stream 211 during the entropic coding step 210.

When a block is reconstructed, it is inserted during a step 218 into a reconstructed image stored in a memory 219 of reconstructed images string the DPB. The reconstructed images thus stored can then serve as reference images for other images to be coded.

Figure 3:
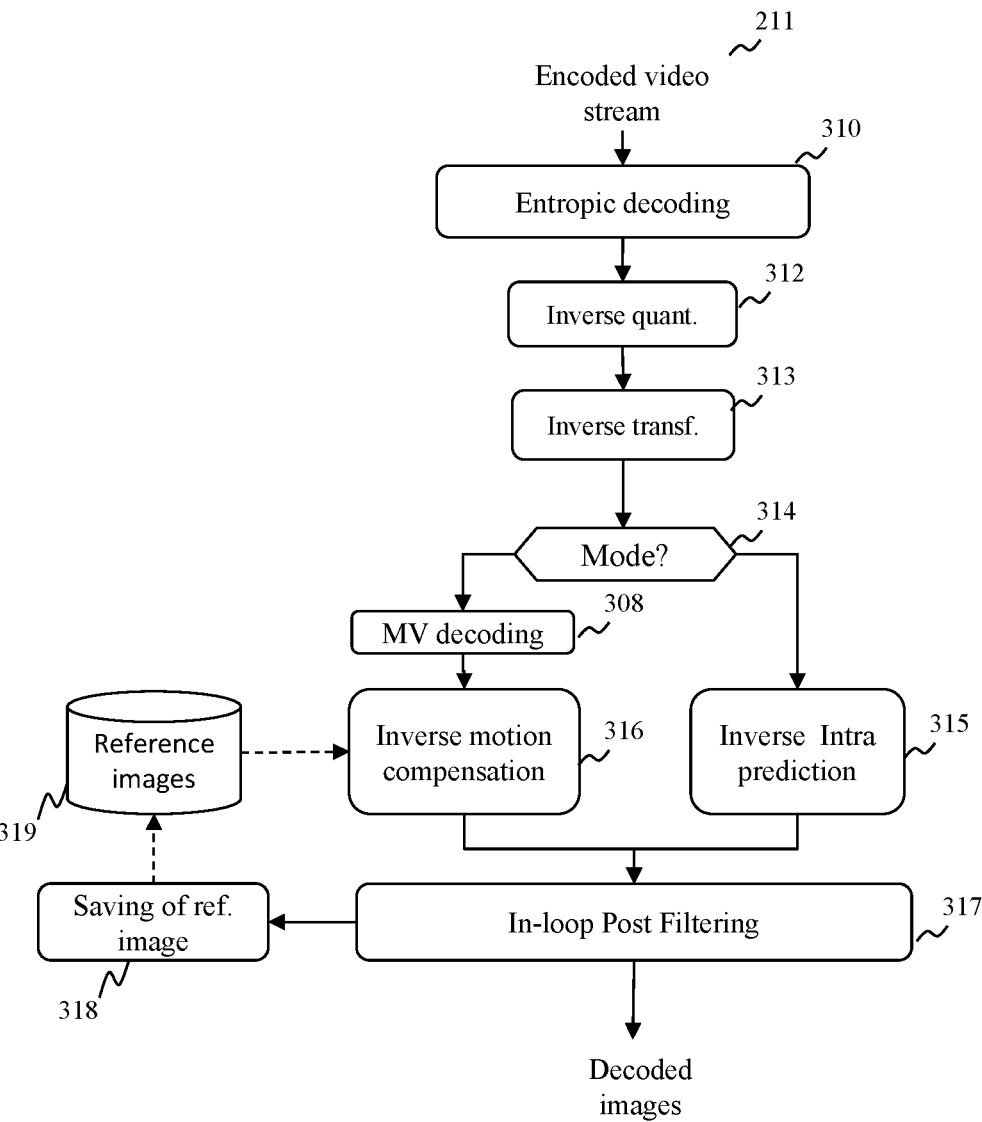
FIG. 3 depicts schematically a method for decoding an encoded video stream.

FIG. 3 depicts schematically a method for decoding the encoded video stream 211 encoded according to method described in relation to FIG. 2 executed by a decoding module. Variations of this method for decoding are contemplated, but the method for decoding of FIG. 3 is described below for purposes of clarity without describing all expected variations.

The decoding is done block by block. For a current block, it starts with an entropic decoding of the current block during a step 310. Entropic decoding allows to obtain the prediction mode of the block.

If the block has been encoded according to an inter prediction mode, the entropic decoding allows to obtain, when appropriate, a prediction vector index, a motion residual and a residual block. During a step 308, a motion vector is reconstructed for the current block using the prediction vector index and the motion residual.

If the block has been encoded according to an intra prediction mode, entropic decoding allows to obtain a prediction direction and a residual block. Steps 312, 313, 314, 315, 316 and 317 implemented by the decoding module are in all respects identical respectively to steps 212, 213, 214, 215, 216 and 217 implemented by the encoding module. Decoded blocks are saved in decoded images and the decoded images are stored in a reference image memory 319 storing the DPB in a step 318. When the decoding module decodes a given image, the images stored in the reference image memory 319 are identical to the images stored in the reference image memory 219 by the encoding module during the encoding of said given image. The decoded image can also be outputted by the decoding module for instance to be displayed.

The decoded image can further go through post-decoding processing (not represented in FIG. 3), for example, an inverse color transform (e.g. conversion from YCbCr 4:2:0 to RGB 4:4:4) or an inverse remapping performing the inverse of the remapping process performed in the pre-encoding processing.

As described above, the selection of a prediction mode for a block is based on a RDO criterion. This selection criterion rarely considers the impact of selecting a prediction mode on the encoding and/or decoding complexity. However, some compression tools are known to increase significantly the encoding/decoding complexity. For instance, the combination of WP with another PSW tool amounts to cascading two weighting stages (one for WP and a second for the other PSW tool), which increases the encoding and decoding complexity. Moreover, two intermediate storage buffers should be used for intermediate bit-depth precision increase during the weighting process.

In addition, the RDO criterion may consider the combination of prediction tools, but generally never considers the order of said tools in said combination. However, depending on the combined tools, some orders may be preferable to others.

Figure 4A:
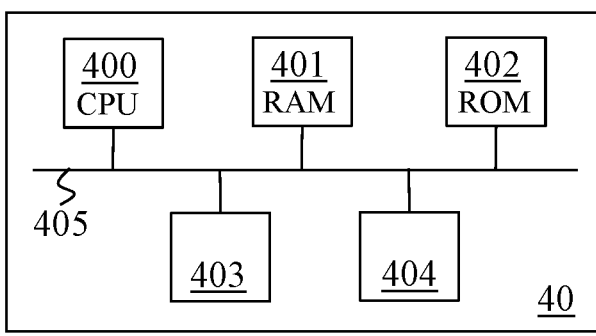
FIG. 4A illustrates schematically an example of hardware architecture of a processing module able to implement an encoding module or a decoding module in which various aspects and embodiments are implemented.

FIG. 4A illustrates schematically an example of hardware architecture of a processing module 40 able to implement an encoding module or a decoding module capable of implementing respectively a method for encoding of FIG. 2 and a method for decoding of FIG. 3 modified according to different aspects and embodiments. The processing module 40 comprises, connected by a communication bus 405: a processor or CPU (central processing unit) 400 encompassing one or more microprocessors, general purpose computers, special purpose computers, and processors based on a multi-core architecture, as non-limiting examples; a random access memory (RAM) 401; a read only memory (ROM) 402; a storage unit 403, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 404 for exchanging data with other modules, devices or equipment. The communication interface 404 can include, but is not limited to, a transceiver configured to transmit and to receive data over communication channel. The communication interface 404 can include, but is not limited to, a modem or network card.

If the processing module 40 implements a decoding module, the communication interface 404 enables for instance the processing module 40 to receive encoded video streams and to provide a decoded video stream. If the processing module 40 implements an encoding module, the communication interface 404 enables for instance the processing module 40 to receive original image data to encode and to provide an encoded video stream.

The processor 400 is capable of executing instructions loaded into the RAM 401 from the ROM 402, from an external memory (not shown), from a storage medium, or from a communication network. When the processing module 40 is powered up, the processor 400 is capable of reading instructions from the RAM 401 and executing them. These instructions form a computer program causing, for example, the implementation by the processor 400 of a decoding method as described in relation with FIG. 3 or an encoding method described in relation to FIG. 2, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 4B:
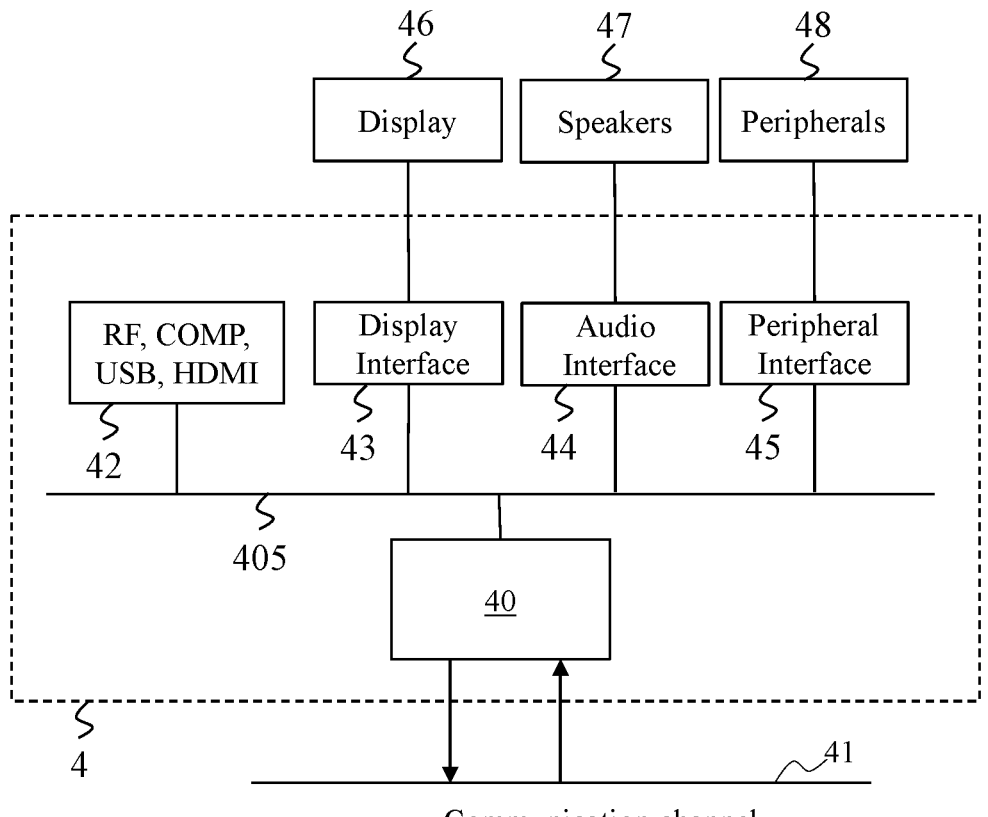
FIG. 4B illustrates a block diagram of an example of a system in which various aspects and embodiments are implemented.

FIG. 4B illustrates a block diagram of an example of a system 4 in which various aspects and embodiments are implemented. System 4 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 4, singly or in combination, can be embodied in a single integrated circuit (IC), multiple ICs, and/or discrete components. For example, in at least one embodiment, the system 4 comprises one processing module 40 that implement a decoding module or an encoding module. But, in another embodiment, the system 4 can comprise a first processing module 40 implementing a decoding module and a second processing module 40 implementing an encoding module or one processing module 40 implementing a decoding module and an encoding module. In various embodiments, the system 40 is communicatively coupled to one or more other systems, or other electronic devices, via, for example, a communications bus or through dedicated input and/or output ports. In various embodiments, the system 4 is configured to implement one or more of the aspects described in this document.

The system 4 comprises at least one processing module 40 capable of implementing one of an encoding module or a decoding module or both.

The input to the processing module 40 can be provided through various input modules as indicated in block 42. Such input modules include, but are not limited to, (i) a radio frequency (RF) module that receives an RF signal transmitted, for example, over the air by a broadcaster, (ii) a component (COMP) input module (or a set of COMP input modules), (iii) a Universal Serial Bus (USB) input module, and/or (iv) a High Definition Multimedia Interface (HDMI) input module. Other examples, not shown in FIG. 4B, include composite video.

In various embodiments, the input modules of block 42 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 4 to other electronic devices across USB and/or HDMI connections. It is to be understood that various aspects of input processing, for example, Reed-Solomon error correction, can be implemented, for example, within a separate input processing IC or within the processing module 40 as necessary. Similarly, aspects of USB or HDMI interface processing can be implemented within separate interface ICs or within the processing module 40 as necessary. The demodulated, error corrected, and demultiplexed stream is provided to the processing module 40.

Various elements of system 4 can be provided within an integrated housing. Within the integrated housing, the various elements can be interconnected and transmit data therebetween using suitable connection arrangements, for example, an internal bus as known in the art, including the Inter-IC (I2C) bus, wiring, and printed circuit boards. For example, in the system 4, the processing module 40 is interconnected to other elements of said system 4 by the bus 405.

The communication interface 404 of the processing module 40 allows the system 4 to communicate on a communication channel 41. The communication channel 41 can be implemented, for example, within a wired and/or a wireless medium.

Data is streamed, or otherwise provided, to the system 4, in various embodiments, using a wireless network such as a Wi-Fi network, for example IEEE 802.11 (IEEE refers to the Institute of Electrical and Electronics Engineers). The Wi-Fi signal of these embodiments is received over the communications channel 41 and the communications interface 404 which are adapted for Wi-Fi communications. The communications channel 41 of these embodiments is typically connected to an access point or router that provides access to external networks including the Internet for allowing streaming applications and other over-the-top communications. Other embodiments provide streamed data to the system 4 using a set-top box that delivers the data over the HDMI connection of the input block 42. Still other embodiments provide streamed data to the system 4 using the RF connection of the input block 42. As indicated above, various embodiments provide data in a non-streaming manner. Additionally, various embodiments use wireless networks other than Wi-Fi, for example a cellular network or a Bluetooth network.

The system 4 can provide an output signal to various output devices, including a display 46, speakers 47, and other peripheral devices 48. The display 46 of various embodiments includes one or more of, for example, a touchscreen display, an organic light-emitting diode (OLED) display, a curved display, and/or a foldable display. The display 46 can be for a television, a tablet, a laptop, a cell phone (mobile phone), or other devices. The display 46 can also be integrated with other components (for example, as in a smart phone), or separate (for example, an external monitor for a laptop). The other peripheral devices 46 include, in various examples of embodiments, one or more of a stand-alone digital video disc (or digital versatile disc) (DVR, for both terms), a disk player, a stereo system, and/or a lighting system. Various embodiments use one or more peripheral devices 46 that provide a function based on the output of the system 4. For example, a disk player performs the function of playing the output of the system 4.

In various embodiments, control signals are communicated between the system 4 and the display 46, speakers 47, or other peripheral devices 48 using signaling such as AV.Link, Consumer Electronics Control (CEC), or other communications protocols that enable device-to-device control with or without user intervention. The output devices can be communicatively coupled to system 4 via dedicated connections through respective interfaces 43, 44, and 45. Alternatively, the output devices can be connected to system 4 using the communications channel 41 via the communications interface 404. The display 46 and speakers 47 can be integrated in a single unit with the other components of system 4 in an electronic device such as, for example, a television. In various embodiments, the display interface 43 includes a display driver, such as, for example, a timing controller (T Con) chip.

The display 46 and speaker 47 can alternatively be separate from one or more of the other components, for example, if the RF module of input 42 is part of a separate set-top box. In various embodiments in which the display 46 and speakers 47 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example, for determining for a CU, if some PSW and OF tools are compatible or not.

As further examples, in one embodiment "decoding" refers only to entropy decoding (step 310 in FIG. 3). Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy encoding. In various embodiments, such processes also, or alternatively, include processes performed by an encoder of various implementations described in this application, for example, for determining for a CU if two or more PSW and/or OF tools are compatible or not.

As further examples, in one embodiment "encoding" to the encoding mode selection (step 206 in FIG. 2) and entropy encoding (step 210 in FIG. 2). Whether the phrase "encoding process" is intended to refer specifically to a subset of operations or generally to the broader encoding process will be clear based on the context of the specific descriptions and is believed to be well understood by those skilled in the art.

Note that the syntax elements names as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/ process.

Various embodiments refer to rate distortion optimization. In particular, during the encoding process, the balance or trade-off between a rate and a distortion is usually considered. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, retrieving the information from memory or obtaining the information for example from another device, module or from user.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a PSW (respectively an OF) tool using PSW (respectively OF) tools parameters. In this way, in an embodiment the same parameters are used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 7:
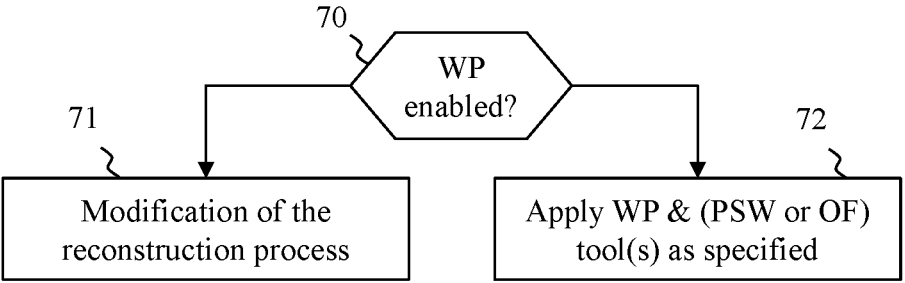
FIG. 7 is a high-level representation of an embodiment of a reconstruction process executed during an encoding process.

FIG. 7 is a high-level representation of an embodiment of a reconstruction process executed during the encoding process of FIG. 2.

The process of FIG. 7 is executed for each block of an image mainly during steps 214 and 216.

In a step 70, the processing module 40 determines if WP is enabled for the current block.

If WP is enabled, step 70 is followed by a step 71. the processing module 40 modifies a part of the encoding process of the current block related to WP and/or to at least one PSW or OF tool.

If WP is disabled, step 70 is followed by a step 72. During step 72, the usual encoding process as specified in document JVET-O2001 is applied to the current block.

In a first embodiment of step 70, the processing module 40 determines a value of a first variable PPS_weighted_pred_flag representative of a syntax element pps_weighted_pred_flag and/or of a second variable PPS_weighted_bipred_flag representative of a syntax element pps_weighted_bipred_flag. As defined in JVET-O2001, the syntax element pps_weighted_pred_flag (respectively pps_weighted_bipred_flag) indicates at the level of an image header (PPS) if mono-directional weighted prediction (respectively bi-directional weighted prediction) is enabled for a P slice (respectively for a B slice) referring to said PPS. If one of the variable PPS_weighted_pred_flag or PPS_weighted_bipred_flag is equal to one (i.e. mono-directional weighted prediction or bi-directional weighted prediction is enabled) in the PPS to which refer the slice comprising the current block, the processing module 40 considers that WP is enabled for the current block. Otherwise, the processing module 40 considers that WP is disabled for the current block.

In some cases, WP could be enabled at the PPS level but the weights used for applying WP could be equal to default weights (i.e. each weight used for WP is equal to one), which amounts to transforms WP to a simple mono-directional or bi-directional inter prediction. In an embodiment based of VVC, when a reference image i is associated to a default weight the syntax elements luma_weight_l0_flag[i] and chroma_weight_l0_flag[i] are equal to zero.

In a second embodiment of step 70, in addition to checking the value of the variables PPS_weighted_pred_flag and PPS_weighted_bipred_flag, the processing module 40 checks also the values of the weights used for WP. When enabled by the syntax elements pps_weighte_d_pred_flag and pps_weighted_bipred_flag, weights used for WP prediction are encoded in slice headers (as represented in sections 7.3.6.1 and 7.3.6.2 of JVET-O2001). The slice header comprises information representative of a weight value for each reference image used for predicting a block of the current slice. In the second embodiment, if at least one weight value represented in the slice header of the slice comprising the current block is different from a default value, the processing module 40 considers that WP is enabled for the current block. Otherwise, the processing module 40 considers that WP is disabled for the current block and WP is a simple mono-directional or bi-directional inter prediction.

When the first and second embodiment of step 70 is applied, in a first embodiment of step 71, the processing module 40 modifies a part of the encoding process of said current block by preventing the use of a PSW or OF tool during the encoding process. In other words, if WP is selected for the current block, PSW and OF tools are not considered as prediction tools that can be used for the current block and no information related to a PSW or OF tool is encoded in the encoded video stream 211. In other words, the bitstream portion of the encoded video stream 211 representative of the current block comprise no syntax element related to a PSW or OF tool.

With the information comprised in the PPS and the slice header, the processing module 40 is capable of determining if WP with non-default weights could be applied to the blocks comprised in the same slice than the current block. In particular, each information representative of a weight comprised in the slice header indicates that the reference image associated with this weight is weighted by said weight when providing a predictor for inter prediction of a block of the slice. The information comprised in the slice header doesn't allow determining on which block WP with non-default weights is actually applied. To determine if WP with non-default weights is applied to the current block, it is necessary to identify which reference image provide a predictor to the current block. In a third embodiment of step 70, after having checked the variables PPS_weighted_pred_flag and PPS_weighted_bipred_flag, and the values of the weights used by WP, the processing module 40 determines which reference image provide a predictor to the current block. If at least one reference image providing a predictor to the current block is associated to a non-default weight, then the processing module 40 determines that weighted prediction is enabled for the current block. Otherwise, the processing module 40 considers that WP is disabled for the current block.

When the third embodiment of step 70 is applied, in a second embodiment of step 71, the processing module 40 modifies a part of the reconstruction process of said current block by not applying the PSW or OF tool during the reconstruction process, even if said PSW or OF tool was selected during step 206 and syntax elements corresponding to said PSW or OF tool were encoded in the encoded video stream 211. In that case however, the regular WP reconstruction process is applied.

When the third embodiment of step 70 is applied, in a third embodiment of step 71, deactivating a PSW or OF tool comprises not applying the regular reconstruction process for said PSW or OF tool even if syntax elements corresponding to said PSW or OF tool were encoded in the encoded video stream 211. In this embodiment, an alternative inter prediction tool is applied by the processing module 40 to the current block instead of the PSW or OF tool specified in the encoded video stream 211. In the third embodiment of step 71 however, the regular WP reconstruction process is applied.

In a first example, called example (1) in the following, of the third embodiment of step 71, WP and TPM mode are enabled for the current block.

In a variant (1a) of example (1), during step 71, the TPM reconstruction process is replaced by a bi-directional inter prediction (B mode) reconstruction process as described above. Equation (1) is applied to determine a predictor bipred for the current block with $w_0 = w_1 = 1$, for all the predictor samples. The predictors $pred_0$ and $pred_1$ are generated using the motion information associated with the two partitions of the TPM mode.

In a variant (1b) of example (1), the TPM reconstruction process is replaced by a bi-directional WP reconstruction process as described above. Equation (2) is applied to determine a predictor bipred for the current block using the WP weight $w_0$ and $w_1$ and offset values $Off_0$ and $Off_1$ associated with reference indexes of predictors $pred_0$ and $pred_1$, for all the samples. The predictors $pred_0$ and $pred_1$ are generated using the motion information associated with the two partitions of the TPM mode.

In a variant (1c) of example (1), the syntax elements indicating the edge direction (merge_triangle_split_dir) is reinterpreted to indicate whether the variant (1a) or (1b) should be applied.

In a variant (1d) of example (1), TPM reconstruction process is replaced either by a process in which the initial CU is divided in two vertical rectangular PU or in two horizontal rectangular PU, one of the PU being predicted using $pred_0$ and the other PU being predicted using $pred_1$ as depicted in FIG. 10. The predictors $pred_0$ and $pred_1$ are generated using the motion information associated with the two partitions of the TPM mode. In an embodiment of the variant (1d), the division into two rectangular PU generates two rectangular PU of unequal size. FIG. 11 describes examples of CU divided in rectangular PU of unequal size.

In a variant (1e) of variant (1d), the syntax elements indicating the edge direction (merge_triangle_split_dir) is reinterpreted to indicate whether the division is vertical or horizontal.

FIG. 12 represents schematically a parsing process corresponding to a variant (1f) of example (1). In the variant (1f) a new syntax element biReg (for example encoded on one bit) is introduced.

In a step 1201, the processing module 40 determines if WP is enabled at the HLS (High Level Syntax) level (for example in a PPS) for the current block.

If WP is enabled at the HLS level, step 1201 is followed by a step 1204. During step 1204, the processing module 40 determines the value of the syntax element biReg by decoding it. If biReg equals a first value (for example if biReg=0), the processing module 40 determines that the reconstruction process of variant (1a) is applied to the current block. If biReg equals a second value (for example if biReg=1), the processing module 40 determines that the reconstruction process of variant (1b) is applied to the current block.

If WP is not activated at the HLS level for the current block, step 1201 is followed by a step 1202 and a step 1203. During step 1202, the processing module 40 determines the value of the syntax element merge_triangle_split_dir indicating the edge direction of the TPM mode by decoding it. In step 1203, the processing module determines the value of the syntax element biReg by decoding it.

In a first embodiment of the variant (1f), if biReg equals a first value (for example if biReg=0) at step 1203, the processing module 40 determines that the reconstruction process of variant (1a) is applied to the current block. If biReg equals a second value (for example if biReg=1) at step 1203, the processing module 40 determines that the reconstruction process of the TPM mode is applied to the current block.

In a second embodiment of variant (1f), if biReg equals a first value (for example if biReg=0) at step 1203, the processing module 40 determines that the reconstruction process of the TPM mode is applied to the current block. if biReg equals a second value (for example if biReg=1) at step 1203, the processing module 40 determines that the reconstruction process of the variant (1e) is applied to the current block. In other words, if biReg=1 the current block (i.e. the current CU) is split in two rectangular PU, and the edge direction is determined using the syntax element merge_triangle_split_dir.

FIG. 13 represents schematically a reconstruction process corresponding to a variant (1g) of example (1).

In a step 1301 the processing module 40 determines if WP with non-default weights is activated for the current block.

If WP is disabled or enabled with default weights for the current block, step 1301 is followed by a step 1302. During step 1302, the processing module applies the TPM reconstruction process to the current block.

If WP with non-default weights is enabled for the current block, step 1301 is followed by a step 1303. In an embodiment of step 1303, the processing module 40 determines if the reference images comprising the predictors $pred_0$ and $pred_1$ designated by the motion information associated with the two partitions of the TPM mode have the same POC (Picture Order Count) (i. e. have the same image number in display order). If the two reference images have the same POC step 1303 is followed by a step 1304.

In an embodiment of step 1304, the processing module 40 applies the reconstruction process of the variant (1a) during step 1304.

In an embodiment of step 1304, the processing module 40 applies the reconstruction process of the variant (1b) during step 1304.

In an embodiment of step 1304, as in the variant (1c), the processing module 40 use the syntax element merge_triangle_split_dir to determine which variant between the variant (1a) and (1b) is applied.

In an embodiment of step 1304, the processing module 40 applies the TPM reconstruction process without applying the WP reconstruction process, even if in that case WP is enabled.

If at step 1303, the processing module 40 determines that the two reference images have different value of POC, step 1303 is followed by step 1302.

In another embodiment of step 1303, the processing module 40 determines if one of the reference images have a POC value $POC_1$ less than a POC value $POC_{curr}$ of the image comprising the current block and if the other reference image have a POC value $POC_2$ greater than the POC value $POC_{curr}$. If $(POC_1 < POC_{curr} < POC_2)$ then the processing module 40 executes step 1302. Otherwise, the processing module 40 executes step 1304. In this embodiment of step 1303, all embodiments of step 1304 can be applied.

In another embodiment of step 1303, the processing module 40 determines if the two reference images have the same POC and if the WP weights are identical. If the two reference images have the same POC and the WP weights are identical, then step 1303 is followed by step 1304. Otherwise, step 1303 is followed by step 1302. In this embodiment of step 1303, all embodiments of step 1304 can be applied.

In a second example, called example (2) in the following, of the third embodiment of step 71, WP and GEO mode are enabled for the current block.

In a first variant (2a) of example (2), during step 71, the GEO reconstruction process is replaced by a bi-directional inter prediction reconstruction process as described above. Equation (1) is applied to determine a predictor bipred for the current block with $w_0 = w_1 = 1$. The predictors $pred_0$ and $pred_1$ are generated using the motion information associated with the two partitions of the GEO mode. As can be seen, variant (2a) is derived from variant (1a).

Similarly, variants (2b, 2c, 2d, 2e, 2f and 2g) can be derived from the variants (1b, 1c, 1d, 1e, 1f and 1g).

In the variant (2b) of example (2) derived from variant (1b), the GEO reconstruction process is replaced by a regular bi-directional WP inter prediction (B mode) reconstruction process.

In the variant (2c) of example (2) derived from the variant (1c), the syntax elements indicating the edge direction wedge_partition_idx is reinterpreted to indicate whether the variant (2a) or (2b) should be applied. However, while the syntax element merge_triangle_split_dir is a binary syntax element able to indicate two edge directions, the syntax element wedge_partition_idx has a greater granularity. In some embodiments, the syntax element wedge_partition_idx can indicate "82" different edge directions. In an embodiment, an half of the possible values of wedge_partition_idx (for example values "0" to "40") indicates that the variant (2a) is applied and the other half of the possible values of wedge_partition_idx (for example values "41" to "81") indicates that the variant (2b) is applied.

In the variant (2d) of example (2) derived from variant (1d), the GEO reconstruction process is replaced by a reconstruction of two vertical or horizontal PU as described in variant (1d). In the variant (2e), the direction of partitioning (vertical or horizontal) is determined using the syntax element indicating the edge direction wedge_partition_idx. In an embodiment, an half of the possible values of wedge_partition_idx (for example values "0" to "40") indicates that the variant (2a) is applied and the other half of the possible values of wedge_partition_idx (for example values "41" to "81") indicates that the variant (2b) is applied.

In the variant (20 the new syntax element biReg is used.

In the step 1201, the processing module 40 determines if WP is enabled at the HLS (High Level Syntax) level (for example in a PPS) for the current block.

If WP is enabled at the HLS level, step 1201 is followed by a step 1204. During step 1204, the processing module 40 determines the value of the syntax element biReg by decoding it. If biReg equals a first value (for example if biReg=0), the processing module 40 determines that the reconstruction process of variant (2a) is applied to the current block. If biReg equals a second value (for example if biReg=1), the processing module 40 determines that the reconstruction process of variant (2b) is applied to the current block.

If WP is not activated at the HLS level for the current block, step 1201 is followed by a step 1202 and a step 1203. During step 1202, the processing module 40 determines the value of the syntax element wedge_partition_idx indicating the edge direction of the GEO mode by decoding it. In step 1203, the processing module determines the value of the syntax element biReg by decoding it.

In a first embodiment of the variant (20, if biReg equals a first value (for example if biReg=0) at step 1203, the processing module 40 determines that the reconstruction process of variant (1a) is applied to the current block. If biReg equals a second value (for example if biReg=1) at step 1203, the processing module 40 determines that the reconstruction process of the GEO mode is applied to the current block.

In a second embodiment of variant (20, if biReg equals a first value (for example if biReg=0) at step 1203, the processing module 40 determines that the reconstruction process of the GEO mode is applied to the current block. if biReg equals a second value (for example if biReg=1) at step 1203, the processing module 40 determines that the reconstruction process of the variant (2e) is applied to the current block. In other words, if biReg=1 the current block (i.e. the current CU) is split in two rectangular PU, and the edge direction is determined using the syntax element wedge_partition_idx.

In a third embodiment of the variant (2f), if biReg equals a first value (for example if biReg=0) at step 1203, the processing module 40 determines a partitioning of the current block using the syntax element wedge_partition_idx. For example, values of wedge_partition_idx between "0" and "40" indicates an horizontal partition of the current block:

values "0" to "7" correspond to a partition in two PU of equal size as represented in the left of FIG. 10;

values "8" to "15" correspond to a partition in a first PU having a height equal to H/4, where H is the height of the current block and a second PU having a height equal to 3×H/4 (top left figure of FIG. 11);

values "16" to "23" correspond to a partition in a first PU having a height equal to 3×H/4 and a second PU having a height equal to H/4 (bottom left figure of FIG. 11);

values "24" to "31" correspond to a partition in a first PU having a height equal to H/3 and a second PU having a height equal to 2×H/3;

values "32" to "40" correspond to a partition in a first PU having a height equal to 2×H/3 and a second PU having a height equal to H/3.

Values of wedge_partition_idx between "41" and "82" indicates a vertical partition of the current block:

values "41" to "48" correspond to a partition in two PU of equal size as represented in the right of FIG. 10;

values "49" to "56" correspond to a partition in a first PU having a height equal to W/4, where W is the width of the current block and a second PU having a width equal to 3×W/4 (top right figure of FIG. 11);

values "57" to "64" correspond to a partition in a first PU having a width equal to 3×W/4 and a second PU having a width equal to W/4 (bottom right figure of FIG. 11);

values "65" to "72" correspond to a partition in a first PU having a width equal to W/3 and a second PU having a width equal to 2×W/3;

values "73" to "81" correspond to a partition in a first PU having a width equal to 2×W/3 and a second PU having a width equal to W/3.

If biReg equals a second value (for example if biReg=1) at step 1203, the processing module 40 determines that the reconstruction process of the GEO mode is applied to the current block. Each PU is then predicted using the motion information of the GEO mode.

In the variant (2g), in the step 1301 the processing module 40 determines if WP with non-default weights is activated for the current block.

If WP is disabled or enabled with default weights for the current block, step 1301 is followed by a step 1302. During step 1302, the processing module applies the GEO mode reconstruction process to the current block.

If WP with non-default weights is enabled for the current block, step 1301 is followed by a step 1303. In an embodiment of step 1303, the processing module 40 determines if the reference images comprising the predictors $pred_0$ and $pred_1$ designated by the motion information associated with the two partitions of the TPM mode have the same POC (Picture Order Count) (i. e. have the same image number in display order). If the two reference images have the same POC step 1303 is followed by a step 1304.

In an embodiment of step 1304, the processing module 40 applies the reconstruction process of the variant (2a) during step 1304.

In an embodiment of step 1304, the processing module 40 applies the reconstruction process of the variant (2b) during step 1304.

In an embodiment of step 1304, as in the variant (2c), the processing module 40 use the syntax element wedge_partition_idx to determine which variant between the variant (2a) and (2b) is applied.

In an embodiment of step 1304, the processing module 40 determines a partitioning of the current block using the syntax element wedge_partition_idx. For example, values of wedge_partition_idx between "0" and "40" indicates an horizontal partition of the current block:

values "0" to "7" correspond to a partition in two PU of equal size as represented in the left of FIG. 10;

values "8" to "15" correspond to a partition in a first PU having a height equal to H/4, where H is the height of the current block and a second PU having a height equal to 3×H/4 (top left figure of FIG. 11);

values "16" to "23" correspond to a partition in a first PU having a height equal to 3×H/4 and a second PU having a height equal to H/4 (bottom left figure of FIG. 11);

values "24" to "31" correspond to a partition in a first PU having a height equal to H/3 and a second PU having a height equal to 2×H/3;

values "32" to "40" correspond to a partition in a first PU having a height equal to 2×H/3 and a second PU having a height equal to H/3.

Values of wedge_partition_idx between "41" and "82" indicates a vertical partition of the current block:

values "41" to "48" correspond to a partition in two PU of equal size as represented in the right of FIG. 10;

values "49" to "56" correspond to a partition in a first PU having a height equal to W/4, where W is the width of the current block and a second PU having a width equal to 3×W/4 (top right figure of FIG. 11);

values "57" to "64" correspond to a partition in a first PU having a width equal to 3×W/4 and a second PU having a width equal to W/4 (bottom right figure of FIG. 11);

values "65" to "72" correspond to a partition in a first PU having a width equal to W/3 and a second PU having a width equal to 2×W/3;

values "73" to "81" correspond to a partition in a first PU having a width equal to 2×W/3 and a second PU having a width equal to W/3.

If at step 1303, the processing module 40 determines that the two reference images have different value of POC, step 1303 is followed by step 1302.

In another embodiment of step 1303, the processing module 40 determines if one of the reference images have a POC value $POC_1$ less than a POC value $POC_{curr}$ of the image comprising the current block and if the other reference image have a POC value $POC_2$ greater than the POC value $POC_{curr}$. If ($POC_1 < POC_{curr} < POC_2$) then the processing module 40 executes step 1302. Otherwise, the processing module applies executes step 1304.

In the variants (1a, 1b) of example (1) and variants (2a, 2b) of example (2) of the third embodiment of step 71, the syntax elements indicating the edge direction (merge_triangle_split_dir for TPM mode or wedge_partition_idx for GEO mode) becomes useless. In another variant of the first and second example of the third embodiment of step 71, the two syntax elements are reinterpreted. In other words, in this variant, the semantic of these two syntax elements is changed. For example:

merge-idx0=merge_triangle_idx0;

delta-idx=merge_triangle_split_dir; and, merge-idx1=delta-idx+merge_triangle_idx1.

In a third example of the third embodiment of step 71, WP and GEO mode are enabled for the current block. In that case, during step 71, the GEO reconstruction process is replaced by a generalized bi-directional inter prediction reconstruction process. Equation (1) is applied to determine a predictor bipred for the current block with weights depending on the number of samples comprised in each partition. For example, referring to FIG. 5B, $w_0$ is proportional to the number of samples in the partition 505 and $w_1$ is proportional to the number of samples in the partition 506. If the block comprising the partitions 505 and 506 is a 16×8 block comprising "128" samples, the partition 505 comprising NB1 samples and the partition 506 comprising NB2 samples, for example $w_0 = NB1/128$ and $w_1 = NB2/128$. The predictors $pred_0$ and $pred_1$ are generated using the motion information associated with the two partitions of the GEO mode. In FIG. 5B, the motion information of the partition 505 is used to generate the predictor pred₀ and the motion information of the partition 506 is used to generate the predictor pred₁.

In a variant of the third example of the third embodiment of step 71, the weights w₀ and w₁ are selected in the set of weights authorized for BCW (i.e. ∈ {−2, 3, 4, 5, 10}). For example, a first partition comprising more samples than a second partition is associated with a higher weight of the set {−2, 3, 4, 5, 10} than the second partition. For example, if we refer again to FIG. 5B, the weight w₀ associated with the partition 505 is equal to "3" and the weight w₁ associated with the partition 506 is equal to "5". Again, the motion information of the partition 505 is used to generate the predictor pred₀ and the motion information of the partition 506 is used to generate the predictor pred₁.

In a fourth example of the third embodiment of step 71, WP and TPM or GEO mode are enabled for the current block. In that case a modified TPM or GEO mode is applied to the current block. In this modified TPM or GEO mode, the division in two partitions (two PU) specified by the TPM or GEO mode is applied to the current block. The predictor associated to each partition is identified and motion compensated using the motion information corresponding to said partition. In a first variant of the fourth example of the third embodiment, after predicting each of the partition, no blending process is applied to the sample values along the frontier between the two partitions (for example the frontier between partition 509 and 510 in FIG. 5C). In a second variant of the fourth example of the third embodiment, after predicting each of the partition, the sample values along the frontier between the two partitions (for example the frontier between partition 509 and 510 in FIG. 5C) are adjusted using a blending processing. However, instead of using an adaptive weighting as described above in relation to FIG. 5C, a simple averaging is applied to the samples located along the frontier. In the example of FIG. 5C, sample values of the samples with identifiers 1, 2, 4, 6 and 7 are computed as follows:

$$Pred(x, y) = \frac{1}{2} \cdot Pred_0(x, y) + \frac{1}{2} \cdot Pred_1(x, y)$$

where Pred₀(x,y) is a sample at position (x,y) in a predictor Pred₀, Predᵢ(x,y) is a sample at position (x,y) in a predictor Pred₁, and the adaptive weights $$w_0^{adapt} \text{ and } w_1^{adapt} \text{ equal } \frac{1}{2}.$$

In a third variant of the fourth example of the third embodiment, the blending processing of the TPM or GEO mode is enabled or disabled by at least one high level syntax (HLS) element. When the at least one HLS element indicates that the blending process is enabled, the blending process of the TPM or GEO mode is disabled if WP is enabled for the current block. The value of the HLS element can also be inferred. In that case again, when the inferred value of the at least one HLS element indicates that the blending process is enabled, the blending process of the TPM or GEO mode is disabled if WP is enabled for the current block.

A HLS element is for example a syntax element at the sequence level (i.e. SPS level) sps_blending_ctrl_flag. The HLS element sps_blending_ctrl_flag indicates if the blending process of the TPM and GEO can be controlled at the slice level (i.e. sps_blending_ctrl_flag=1) or not (i.e. sps_blending_ctrl_flag=0). If not present, the value of the HLS element sps_blending_ctrl_flag may be inferred from other syntax elements. In an embodiment, the HLS element sps_blending_ctrl_flag is present in a SPS header when a syntax element sps_triangle_enabled_flag is equal to true and a syntax element sps_weighted_pred_flag is equal to false. The syntax element sps_triangle_enabled_flag specifies whether the TPM or GEO mode can be used for inter prediction (if sps_triangle_enabled_flag=true) or not (if sps_triangle_enabled_flag=false) for a block of a P slice referring to the SPS. The syntax element sps_weighted_pred_flag equal to true specifies that weighted prediction may be applied to P slices referring to the SPS. sps_weighted_pred_flag equal to false specifies that weighted prediction is not applied to P slices referring to the SPS.

TABLE TAB_A

| | |
|---|---|
| if( sps_triangle_enabled_flag && !sps_weighted_pred_flag ) | |
|    sps_blending_ctrl_flag | u(1) |

Table TAB_A describes an example of syntax at the SPS level related to the HLS element sps_blending_ctrl_flag.

When a slice refers to a SPS indicating by the sps_blending_ctrl_flag that the activation of deactivation of the TPM or GEO blending process can be controlled at the slice level, a slice level syntax element slice_blending_off_flag indicates if said blending process is actually activated (slice_blending_off_flag=1) or not (slice_blending_off_flag=0) for said slice.

TABLE TAB_B

| | |
|---|---|
| if( sps_triangle_enabled_flag && MaxNumMergeCand >= 2 && !pps_max_num_merge_cand_minus_max_num_triangle_cand_minus1 ) | |
| { | |
|    max_num_merge_cand_minus_max_num_triangle_cand | ue(v) |
|    if( sps_blending_ctrl_flag && ! (pps_weighted_pred_flag && slice_type = = P) && !(pps_weighted_bipred_flag && slice_type = = B) ) | |
|      slice_blending_off_flag | ue(v) |
| } | |

Table TAB B describes an example of syntax at the slice level related to the syntax element slice_blending_off_flag.

As can be seen, the syntax element slice_blending_off_flag is present in a slice header when a set of conditions are fulfilled. For example, the set of conditions comprises:

the TPM or GEO mode is enabled for the current slice (sps_triangle_enabled_flag=true);

the control of the blending process of the TPM or GEO at the slice level is enabled (sps_blending_ctrl_flag=true);

WP is disabled for P slices (!(pps_weighted_pred_flag && slice_type==P));

WP is disabled for B slices (!(pps_weighted_bipred_flag && slice_type==B)).

if the syntax element slice_blending_off_flag is not present, it is inferred to "0".

At a block level, a variable blending_off_flag specifies if the blending processing of the TPM or GEO mode is applied to the current block.

Lets denote:

cIdx a colour component index of the current block;

A and B two TPM (or GEO) partitions of the current block;

predListFlagA and predListFlagB prediction list flags of partitions A and B;

refIdxA and reildxB reference indices of partitions A and B

The variable blending_off_flag is derived as follows:

blending_off_flag is initialized to the value of the syntax element slice_blending_off_flag;

If the variable blending_off_flag is equal to "1", the variable blending_off_flag is not modified;

Otherwise, if cIdx is equal to "0" and ((predListFlagX=0 and the luma weight associated with the reference indice refidzX is a non-default weight (i.e. luma_weight_l0_flag[refIdxX] is equal to "1")) or (predListFlagX=1 and the luma weight associated with the reference indice refIdX is a non-default weight (i.e. luma_weight_l1_flag[refIdxX] is equal to 1))), then the variable blending_off_flag is set equal to "1" (i.e. the blending process of the TPM or GEO mode is inactivated for the luma component of the current block), Otherwise, if cIdx is not equal to "0" and ((predListFlagX=0 and the chroma weight associated with the reference indice refIdxX is a non-default weight (i.e. chroma_weight_l0_flag[refIdxX] is equal to 1)) or (predListFlagX=1 and the chroma weight associated with the reference indice refIdxX is a non-default weight (i.e. chroma_weight_l1_flag[refIdxX] is equal to 1))), then blending_off_flag is set equal to "1" (i.e. the blending process of the TPM or GEO mode is inactivated for the chroma component of the current block).

In a variant, said SPS level HLS syntax (sps_triangle_enabled_flag, sps_weighted_pred_flag, sps_blending_ctrl_flag) can be replaced by a HLS syntax at the PPS level (pps_triangle_enabled_flag, pps_weighted_pred_flag, pps_blending_ctrl_flag) with the same semantic.

In a fourth variant of the fourth example of the third embodiment, the blending process of the TPM or GEO mode is inactivated when WP is enabled at the HLS level for the current block.

In a fifth variant of the fourth example of the third embodiment, the blending processing of the TPM or GEO mode is inactivated when WP is enabled at the HLS level and at least one WP weight is equal to a non-default weight for the current block.

The VVC standard as specified in JVET-O2001, specifies the order of execution of the prediction tools. For example, in the current version of VVC, when WP is enabled, WP is applied after the PROF mode. In a fourth embodiment of step 71 the order of execution of WP and of the PSW or OF tool is modified. In an example of the fourth embodiment of step 71, WP is applied before the PROF mode. In a variant, the choice whether to apply WP after or before the PROF mode depends on the WP weights and offset values. For example, if the weights are superior to "1", then WP is performed before, otherwise it is done after, so the PROF mode applies on a wide range signal.

In the current version of VVC as described in JVET-O2001, when WP is enabled, the DMVR and BDOF modes are disabled. In a fifth embodiment of step 71, WP is applied before the DMVR or BDOF modes. This increases the encoding complexity (two additional buffers to store the references weighted with WP, and one additional weighting stage of the motion compensated prediction) but improves the prediction accuracy.

In a sixth embodiment of step 71, in order to reduce the complexity, the PROF mode is disabled when WP is enabled.

In the current version of VVC as described in JVET-O2001, when WP is enabled, WP is applied before the CIIP mode blending process. In a seventh embodiment of step 71, in order to reduce complexity, the CIIP mode is disabled when WP is enabled.

In an eighth embodiment of step 71, when WP and the CIIP mode are both enabled for the current block, the regular CIIP mode is applied to the current block but the WP weights and offsets are set to default values for the current block.

Until now, it is considered that the WP and PSW or OF tool processes are cascaded, i.e. performed sequentially. A consequence of this cascading is that if a first tool (for example WP) is applied before a second tool (for example a PSW or OF tool), the second tool is applied on the result of the first tool. In a ninth embodiment of step 71, we focus on combinations of WP and at least one PSW tool. The modification of the part of the encoding process of the current block related to the weighted prediction and/or to the at least one PSW tool consists in mixing the WP and PSW tool in a single weighting (blending) stage. The mixed tools could be WP and CIIP or WP and GEO or WP and TPM or WP and LIC and CIIP. It is also possible to mix PSW tools together. For example, in that case, the mixed tools are LIC and TPM or BCW and TPM or BCW and CIIP. During the mixing process, the weights and offsets of the mixed tools are combined together so that one single weighting (blending) process is applied.

PSW tools can be classified in two sub-groups: A first sub-group of PSW tools in which the offset is made after the right shift; a second sub-group of PSW tools in which the offset is made before the right shift. The first sub-group comprises the BCW mode, the CIIP mode and the bi-directional WP. The second sub-group comprises the mono-directional WP and the LIC mode.

For example, let's denote $(a_i, b_i, s_i)$ respectively the sample weight, offset and right shift values associated to a PSW tool "i" and pred(x,y) a corresponding sample prediction.

If a tool i=0 is combined with a tool 1=1, the tools "0" and "1" belonging to the first sub-group of PSW tools, the prediction sample could be obtained with the following equation:

$$pred(x, y) =$$

$$((a_0 \cdot a_1 \cdot pred_0(x, y) + a_1(b_0 \ll s_0) + (1 \ll (s_0 + s_1 - 1))) \gg (s_0 + s_1)) + b_1$$

where $pred_0$ (x, y) is a motion compensated predictor sample taken in the list L0 of reference images stored in the DPB and spatially corresponding to pred(x, y). This equation is applied when combining mono-directional WP and the LIC mode.

If the tools "0" and "1" belong to the second sub-group of PSW tools, the prediction sample could be obtained with the following equation:

$$pred(x, y) =$$
$$(a_0 \cdot a_1 \cdot pred_0(x, y) + a_1(b_0 \ll s_0) + (b_1 \ll s_0) + (1 \ll (s_0 + s_1 - 1))) \gg$$
$$(s_0 + s_1)$$

This equation is applied when combining bi-directional WP and the BCW mode or bi-directional WP and the CIIP mode or the CIIP mode and the BCW mode.

Similar equations could be derived for combinations of a tool of the first sub-group and a tool of the second sub-group and for combinations of more than two PSW tools.

Figure 8:
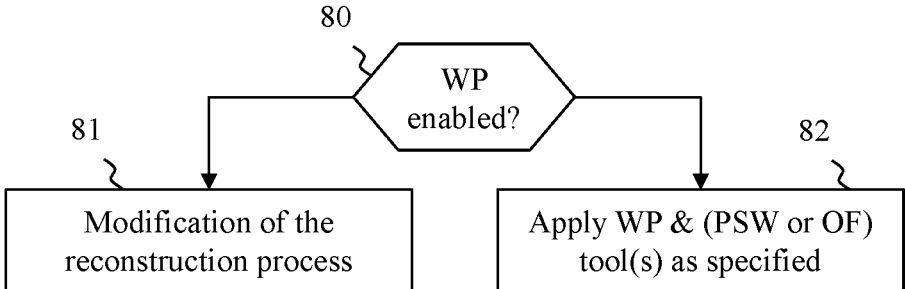
FIG. 8 is a high-level representation of an embodiment of a reconstruction process executed during a decoding process.

FIG. 8 is a high-level representation of an embodiment of a reconstruction process executed during the decoding process.

One can note that the processes applied during the encoding process and the decoding process are symmetrical. Consequently, many embodiments described in relation to the encoding process have symmetrical embodiments during the decoding process.

The process of FIG. 8 is executed on each block of a current image mainly during steps 314, 308 and 316.

In a step 80, the processing module 40 determines if WP is enabled for the current block.

If WP is enabled, step 80 is followed by a step 81. During step 81, the processing module 40 modifies a part of the reconstruction process of said current block related to WP and/or to the at least one PSW or OF tool.

If WP is disabled, step 80 is followed by a step 82. During step 82, the usual reconstruction process as specified in document JVET-O2001 is applied to the current block.

In a first embodiment of step 80, the processing module 40 checks from the encoded video stream 211 the value of the syntax element pps_weighted_pred_flag and pps_weighted_bipred_flag in the PPS to which refer the slice comprising the current block. If one of the syntax elements pps_weighted_pred_flag or pps_weighted_bipred_flag is equal to one, the processing module 40 considers that WP is enabled for the current block. Otherwise, the processing module 40 considers that WP is disabled for the current block.

In second embodiment of step 80, in addition to checking the value of the syntax elements pps_weighted_pred_flag and pps_weighted_bipred_flag from the PPS referred by the slice comprising the current block, the processing module 40 checks also the values of the weights used for WP in the slice header of said slice. If at least one of said weight values is different from a default value, the processing module 40 considers that WP is enabled for the current block. Otherwise, the processing module 40 considers that WP is disabled for the current block.

When the first or second embodiment of step 80 is applied, in a first embodiment of step 81, the processing module 40 modifies a part of the reconstruction process of said current block by not parsing or inferring the syntax elements related to the PSW or OF tool in the encoded video stream. In that case however, the regular WP reconstruction process is applied.

FIG. 9 discloses an example of a part of a reconstruction process modified according to the first or second embodiment of step 80.

In a step 901, the processing module 40 checks a first combination of conditions comprising a condition CIIP indicating if the CIIP mode is enabled or not for the current block, a condition TPM indicating if the TPM mode is enabled for the current block or not, a condition wp_disabled indicating if WP is disabled for the current block or not and a condition OtherConditions described in JVET_O2001. If the first combination of conditions (OtherConditions and ((CIIP) or (TPM and wp_disabled))) is true, during a step 902, the processing module 40 parse from the encoded video stream 211 a syntax element regular_merge_flag specified in document JVET-O2001. Step 902 is followed by a step 903. When the first combinations of conditions is false in step 901, step 901 is directly followed by step 903. In that case, the value of the syntax element regular_merge_flag is inferred by the processing module 40 from the value of other syntax elements specified by the standard VVC (regular_merge_flag=(general_merge_flag && !merge_sub-block_flag)).

In step 903, the processing module 40 checks the value of the syntax element regular_merge_flag. If regular_merge_flag=true, the processing module 40 determines during a step 904 that the current block uses a merge mode and decodes regular merge parameters.

If regular_merge_flag=false, the processing module 40 checks a second combinations of conditions ((OtherConditions and ((CIIP) and (TPM and wp_disabled))) during a step 905. If the second combination of conditions is false, step 905 is followed by a step 906. Otherwise, step 905 is followed by a step 907.

During step 906, the processing module 40 infers a value of a syntax element ciip_flag and a value of a syntax element MergeTriangleFlag. Ciip_flag=1 indicates that the CIIP mode applies to the current block. ciip_flag=0 indicates that CIIP mode doesn't apply to the current block. MergeTriangleFlag=1 indicates that the TPM mode applies to the current block. MergeTriangleFlag=0 indicates that TPM mode doesn't apply to the current block. In step 906, one CIIP mode or TPM mode applies. The parameters of the CIIP or TPM mode are also inferred by the processing module 40.

During step 907, the processing module 40 decodes from the encoded video stream 211 the syntax element clip flag.

During a step 908, the processing module 40 checks the value of the syntax element ciip_flag. If ciip_flag=1, step 908 is followed by a step 909. If ciip_flag=0, step 908 is followed by a step 910.

During step 909, the processing module 40 decodes parameters of the CIIP mode from the encoded video stream 211.

During step 910, the processing module 40 decodes parameters of the TPM mode from the encoded video stream 211.

From the algorithm described in relation to FIG. 9, it can be seen that TPM parameters are inferred (step 906) or parsed (step 910) from the encoded video stream 211 only if WP is disabled.

In an embodiment, the modification of the reconstruction process according to the first or second embodiment of step 80 implies modifications of the merge data syntax as described in section 7.3.8.7 of JVET-O2001.

TAB1

| | Descriptor |
|---|---|
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight | |
| >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (sps_ciip_enabled_flag && | |
|         cu_skip_flag[ x0 ][ y0 ] = = 0 && cbWidth < 128 && cbHeight < | |
| 128)                              \| \| | |
|        ( wp_disabled && sps_triangle_enabled_flag && | |
| MaxNumTriangleMergeCand > 1 && | |
|       slice type = = B ) ) ) | |
|       regular_merge_flag[ x0 ][ y0 ] | ae(v) |
|     if ( regular_merge_flag[ x0 ][ y0 ] = = 1 ){ | |
|       if( sps_mmvd_enabled_flag ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       if( sps_ciip_enabled_flag && wp_disabled && | |
| sps_triangle_enabled_flag && | |
|       MaxNumTriangleMergeCand > 1 && slice_type = = B && | |
|       cu_skip_flag[ x0 ][ y0 ] == 0 && | |
|       ( cbWidth * cbHeight ) >= 64 && cbWidth < 128 && cbHeight < | |
| 128 ) { | |
|         ciip_flag[ x0 ][ y0 ] | ae(v) |
|       if( ciip_flag[ x0 ][ y0 ] && MaxNumMergeCand > 1 ) { | |
|       merge_idx[ x0 ] [ y0 ] | ae(v) |
|       if( !ciip_flag[ x0 ][ y0 ] && MaxNumTriangleMergeCand > 1 ) { | |
|       merge_triangle_split_dir[ x0 ][ y0 ] | ae(v) |
|       merge_triangle_idx0[ x0 ][ y0 ] | ae(v) |
|       merge_triangle_idx1[ x0 ][ y0 ] | ae(v) |
|       } | |
|       } | |
|     } | |
|     } | |
|   } | |
| } | |

The syntax modifications of the merge data syntax appear in bold in the table TAB1.

In another embodiment, the modification of the reconstruction process according to the first or second embodiment of step 80 implies modifications of the slice header syntax as described in section 7.3.6.1 of JVET-O2001.

TAB2

| | Descriptor |
|---|---|
| slice_header( ) { | |
|   ... | |
|   if (slice_type != I ) { | |
|     ... | |
|     if( wp_disabled && sps_triangle_enabled_flag && MaxNumMergeCand | |
| >= 2 && | |
|       !pps_max_num_merge_cand_minus_max_num_triangle_cand_minus1 | |
| ) | |
|       [Ed. (YK): There is a syntax element name subsetting issue here.] | |

-continued

| TAB2 | |
| --- | --- |
| | Descriptor |
| max_num_merge_cand_minus_max_num_triangle_cand | ue(v) |
| } | |
| ... | |

As can be seen from table TAB2, the syntax element max_num_merge_cand_minus_max_num_triangle_cand is present in the slice header only if WP is disabled. The syntax element max_num_merge_cand_minus_max_num_triangle_cand is representative of a maximum number of TPM mode candidates supported in the slice. This syntax element is useless when it is known that the TPM mode is disabled, which is the case when WP is enabled for the current slice. Consequently, during the decoding process, when WP is enabled for a slice, the processing module 40 doesn't intend to parse the syntax element max_num_merge_cand_minus_max_num_triangle_cand.

In a variant of the algorithm of FIG. 9, the condition TPM is replaced by a condition GEO. The condition GEO indicates if the GEO mode is enabled for the current block or not. In this variant, the GEO parameters are inferred (step 906) or parsed (step 910) from the encoded video stream 211 only if WP is disabled. In addition, in the table TAB1, the syntax elements sps_triangle_enabled_flag, MaxNumTri-angleMergeCand, merge_triangle_split_dir, merge_trian-gle_idx0, merge_triangle_idx1 are respectively replaced by the syntax elements sps_wedge_enabled_flag, MaxNumWedgeMergeCand, wedge_partition_idx, merge_wedge_idx0 and merge_wedge_idx1. In table TAB2, the syntax elements sps_triangle_enabled_flag, pps_max_num_merge_cand_minus_max_num_triangle_cand_minus1, and max_num_merge_cand_minus_max_num_triangle_cand are respectively replaced by sps_wedge_enabled_flag pps_max_num_merge_cand_minus_max_num_wedge_cand_minus1, and max_num_merge_cand_minus_max_num_wedge_cand.

In a variant of the algorithm of FIG. 9, the condition CLIP is replaced by a condition (CLIP and wp_disabled). In this variant, the CIIP parameters are inferred (step 906) or parsed (step 909) from the encoded video stream 211 only if WP is disabled. In that case, the merge data syntax is modified as follows (the modifications are represented in bold in table TAB5):

| TAB3 | |
| --- | --- |
| | Descriptor |
| merge_data( x0, y0, cbWidth, cbHeight, chType ) { | |
|   if ( CuPredMode[ chType ][ x0 ][ y0 ] = = MODE_IBC ) { | |
|     if( MaxNumIbcMergeCand > 1 ) | |
|       merge_idx[ x0 ][ y0 ] | ae(v) |
|   } else { | |
|     if( MaxNumSubblockMergeCand > 0 && cbWidth >= 8 && cbHeight >= 8 ) | |
|       merge_subblock_flag[ x0 ][ y0 ] | ae(v) |
|     if( merge_subblock_flag[ x0 ][ y0 ] = = 1 ) { | |
|       if( MaxNumSubblockMergeCand > 1 ) | |
|         merge_subblock_idx[ x0 ][ y0 ] | ae(v) |
|     } else { | |
|       if( ( cbWidth * cbHeight ) >= 64 && ( (wp_disabled && sps_ciip_enabled_flag && cu_skip_flag[ x0 ][ y0 ] = = 0 && cbWidth < 128 && cbHeight < 128) \|\| ( sps_triangle_enabled_flag && MaxNumTriangleMergeCand > 1 && slice type = = B ) ) ) | |
|       regular_merge_flag[ x0 ][ y0 ] | ae(v) |
|     if ( regular_merge_flag[ x0 ][ y0 ] = = 1 ){ | |
|       if( sps_mmvd_enabled_flag ) | |
|         mmvd_merge_flag[ x0 ][ y0 ] | ae(v) |
|       if( mmvd_merge_flag[ x0 ][ y0 ] = = 1 ) { | |
|         if( MaxNumMergeCand > 1 ) | |
|           mmvd_cand_flag[ x0 ][ y0 ] | ae(v) |
|         mmvd_distance_idx[ x0 ][ y0 ] | ae(v) |
|         mmvd_direction_idx[ x0 ][ y0 ] | ae(v) |
|       } else { | |
|         if( MaxNumMergeCand > 1 ) | |
|           merge_idx[ x0 ][ y0 ] | ae(v) |
|       } | |
|     } else { | |
|       if(wp_disabled && sps_ciip_enabled_flag && sps_triangle_enabled_flag && MaxNumTriangleMergeCand > 1 && slice_type = = B && cu_skip_flag[ x0 ][ y0 ] = = 0 && ( cbWidth * cbHeight) >= 64 && cbWidth < 128 && cbHeight < 128 ){ | |

-continued

| TAB3 | |
|---|---|
| | Descriptor |
| ciip_flag[ x0 ][ y0 ] | ae(v) |
| if( ciip_flag[ x0 ][ y0 ] && MaxNumMergeCand > 1 ) | |
|   merge_idx[ x0 ] [ y0 ] | ae(v) |
| if( !ciip_flag[ x0 ][ y0 ] && MaxNumTriangleMergeCand > 1 ) { | |
|   merge_triangle_split_dir[ x0 ][ y0 ] | ae(v) |
|   merge_triangle_idx0[ x0 ][ y0 ] | ae(v) |
|   merge_triangle_idx1[ x0 ][ y0 ] | ae(v) |
|   } | |
|   } | |
|   } | |
|  } | |
| } | |

As already mentioned above, the parsing of the PPS to which refer the slice comprising the current block and of the slice header of said slice, doesn't allow the processing module 40 to determine if WP with non-default weights is actually applied to the current block. To obtain this information, the processing module 40 needs to parse the syntax elements representative of the current block (i.e. the coding unit syntax as described in section 7.3.8.5 of JVET-O2001). In particular, the parsing of the syntax elements representative of the current block allows determining a value of a syntax elements ref_idx_l0 and ref_idx_l1. The syntax elements ref_idx_l0 (respectively ref_idx_l1) represent an index in list L0 (respectively in list L1) of reference images of the DPB of an image providing a predictor to the current block. With the index ref_idx_l0 (respectively ref_idx_l1), the processing module 40 can determine from flags luma_weight_l0_flag[ ] for luma and chroma_weight_l0_flag[ ] for chroma (respectively luma_weight_l1_flag[ ] and chroma_weight_l1_flag[ ]) encoded in the slice header, if at least one reference image providing a predictor for the current block is weighted with non-default weight. Indeed, a flag equal to "1" specifies that the corresponding weight has a non-default value. A flag equal to "0" specifies that the weight has a default value.

For some PSW or OF tools, the syntax elements ref_idx_lx can only be accessed by parsing the syntax of the PSW or OF tool. This is in particular the case for the TPM, GEO, CIIP modes. For example, in FIG. 9, steps 906 or 909 or 910 should be performed to access to the syntax elements ref_idx_lx of the current block. In a third embodiment of step 80, after having checked the values of the syntax elements pps_weighted_pred_flag and pps_weighted_bi-pred_flag in the PPS referred by the slice comprising the current block, and the values of the weights used by WP from the slice header of said slice, the processing module 40 parses or infers the syntax elements related to the PSW or OF tools of the current block to obtain the values of the index ref_idx_lx (with lx equal to l0 or l1). From the index ref_idx_l0 and ref_idx_l1, the processing module 40 determines the values of the flags luma_weight_lx_flag[ref_idx_lx] or chroma_weight_lx_flag[ref_idx_lx]. If at least one of said flag is equal to "1", then the processing module 40 considers that WP is enabled for the current block (i.e if condition cond is false with cond=(luma_weight_l0_flag[ref_idx_l0]==0 &&luma_weight_l1_flag[ref_idx_l1]==0 &&chroma_weight_l0_flag[ref_idx_l0]==0 &&chroma_weight_l1_flag[ref_idx_l1]==0) for bi-directional prediction or cond=(luma_weight_lx_flag[ref_idx_lx]==0 &&chroma_weight_lx_flag[ref_idx_lx]==0) for mono-directional prediction, then the processing device 40 considers that WP is enabled).

Otherwise, the processing module 40 considers that WP is disabled for the current block. In other words, if each flag luma_weight_lx_flag[ref_idx_lx] and chroma_weight_lx_flag[ref_idx_lx] associated to the current block is equal to "0", then the processing device 40 considers that WP is disabled (i.e if condition cond is true then the processing device 40 considers that WP is disabled).

When the third embodiment of step 80 is applied, in a second embodiment of step 81, the processing module 40 modifies a part of the reconstruction process of said current block by parsing or inferring the syntax elements related to the PSW or OF tool in the encoded video stream 211 but without applying the PSW or OF tool to the current block. In other words, even if a PSW or OF tool is specified in the encoded video stream 211, the reconstruction process corresponding to said PSW or OF tool is deactivated. In that case however, the regular WP reconstruction process is applied.

When the third embodiment of step 80 is applied, in a third embodiment of step 81, deactivating a PSW or OF tool comprises parsing or inferring the syntax elements related to said PSW or OF tool during the reconstruction of the current block, but not applying the regular reconstruction process for said PSW or OF tool. In this embodiment, an alternative inter prediction tool is applied by the processing module 40 to the current block instead of the PSW or OF tool specified in the encoded video stream 211. In the third embodiment of step 81 however, the regular WP reconstruction process is applied.

In a first example, called example (3) in the following, of the third embodiment of step 81, WP and TPM mode are enabled for the current block.

In a variant (3a) of example (3), during step 81, the TPM reconstruction process is replaced by a bi-directional inter prediction (B mode) reconstruction process as described above. Equation (1) is applied to determine a predictor bipred for the current block with $w_0=w_1=1$, for all the predictor samples. The predictors $pred_0$ and $pred_1$ are generated using the motion information associated with the two partitions specified in the syntax elements related to the TPM mode. As can be seen, the variant (3a) applied during the decoding process is identical to the variant (1a) applied during the encoding process.

Similarly, variants (3b, 3c, 3d, 3e, 3f and 3g) respectively identical to the variants (1b, 1c, 1d, 1e, 1f and 1g) can be applied during the decoding process in place of the variant (3a).

In a second example, called example (4) in the following, of the third embodiment of step 81, WP and GEO mode are enabled for the current block.

In a first variant (4a) of example (2), during step 81, the GEO reconstruction process is replaced by a bi-directional inter prediction reconstruction process as described above. Equation (1) is applied to determine a predictor bipred for the current block with $w_0 = w_1 = 1$. The predictors $pred_0$ and $pred_1$ are generated using the motion information associated with the two partitions specified in the syntax elements related to the GEO mode. As can be seen, the variant (4a) applied during the decoding process is identical to the variant (2a) applied during the encoding process.

Similarly, variants (4b, 4c, 4d, 4e, 4f and 4g) respectively identical to the variants (2b, 2c, 2d, 2e, 2f and 2g) can be applied during the decoding process in place of the variant (4a).

In the variants (3a), (3b), (4a) and (4b) of examples (3) and (4) of the third embodiment of step 81, the syntax elements indicating the edge direction (merge_trian-gle_split_dir for TPM mode or wedge_partition for GEO mode) becomes useless. In another variant of the examples (3) and (4) of the third embodiment of step 81, the two syntax elements are reinterpreted. In other words, in this variant, the semantic of these two syntax elements is changed. For example:

merge-idx0=merge_triangle_idx0;

delta-idx=merge_triangle_split_dir; and, merge-idx1=delta-idx+merge_triangle_idx1.

In a third example of the third embodiment of step 81, WP and GEO mode are enabled for the current block. In that case, during step 81, the GEO reconstruction process is replaced by a generalized bi-directional inter prediction reconstruction process. Equation (1) is applied to determine a predictor bipred for the current block with weights depending on the number of samples comprised in each partition. For example, referring to FIG. 5B, $w_0$ is proportional to the number of samples in the partition 505 and $w_1$ is proportional to the number of samples in the partition 506. If the block comprising the partitions 505 and 506 is a 16×8 block comprising "128" samples, the partition 505 comprising NB1 samples and the partition 506 comprising NB2 samples, for example $w_0 = NB1/128$ and $w_1 = NB2/128$. The predictors $pred_0$ and $pred_1$ are generated using the motion information associated with the two partitions specified in the syntax elements related to the GEO mode. In FIG. 5B, the motion information of the partition 505 is used to generate the predictor $pred_0$ and the motion information of the partition 506 is used to generate the predictor $pred_1$.

In a variant of the third example of the third embodiment of step 81, the weights $w_0$ and $w_1$ are selected in the set of weights authorized for BCW (i.e. $\in \{-2, 3, 4, 5, 10\}$). For example, a first partition comprising more samples than a second partition is associated with a higher weight of the set $\{-2, 3, 4, 5, 10\}$ than the second partition. For example, if we refer again to FIG. 5B, the weight $w_0$ associated with the partition 505 is equal to "3" and the weight $w_1$ associated with the partition 506 is equal to "5". Again, the motion information of the partition 505 is used to generate the predictor $pred_0$ and the motion information of the partition 506 is used to generate the predictor $pred_1$.

In a fourth example of the third embodiment of step 81, WP and TPM or GEO mode are enabled for the current block. In that case a modified TPM or GEO mode is applied to the current. In this modified TPM or GEO mode, the division in two partitions (two PU) specified by the TPM or GEO syntax elements in the encoded video stream 211 is applied to the current block. The predictor associated to each partition is identified and motion compensated using the motion information corresponding to said partition. After predicting each of the partition, the sample values along the frontier between the two partitions (for example the frontier between partition 509 and 510 in FIG. 5C) are adjusted using a blending processing. However, instead of using an adaptive weighting as described above in relation to FIG. 5C, a simple averaging is applied to the samples located along the frontier. In the example of FIG. 5C, sample values of the samples with identifiers 1, 2, 4, 6 and 7 are computed as follows:

$$Pred(x, y) = \frac{1}{2} \cdot Pred_0(x, y) + \frac{1}{2} \cdot Pred_1(x, y)$$

where $Pred_0(x,y)$ is a sample at position (x,y) in a predictor $Pred_0$, $Pred_i(x,y)$ is a sample at position (x,y) in a predictor $Pred_1$, and the adaptive weights $$w_0^{adapt} \text{ and } w_1^{adapt} \text{ equal } \frac{1}{2}.$$

As already mentioned in relation to FIG. 7, the VVC standard as specified in JVET-O2001, specifies the order of execution of the prediction tools. For example, in the current version of VVC, when WP is enabled, WP is applied after the PROF mode. In a fourth embodiment of step 81 the order of execution of the WP reconstruction process and of the PSW or OF tool reconstruction process is modified. In an example of the fourth embodiment, WP is applied before the PROF mode. In a variant, the choice whether to apply WP after or before the PROF mode depends on the WP weights and offset values. For example, if the weights are superior to "1", then WP is performed before, otherwise it is done after, so the PROF mode applies on a wide range signal.

In the current version of VVC as described in JVET-O2001, when WP is enabled, the DMVR and BDOF modes are disabled. In a fifth embodiment of step 81, WP is applied before the DMVR and BDOF reconstruction process. This increases the decoding complexity (two additional buffers to store the references weighted with WP, and one additional weighting stage of the motion compensated prediction) but improves the prediction accuracy. Indeed, both DMVR and BDOF are bi-directional prediction tools (a reference image ref-0 and a reference image ref-1 are used to compute current prediction) performing local (sub-block) motion vector refinement by assuming:

1. local motion is constant between ref-0 and ref-1, and
2. the local illumination change between ref-0 and ref-1 is only due to slight misalignment of motion compensated sub-block of ref-0 (pred-O) and motion compensated sub-block of ref-1 (pred-1). This misalignment of prediction sample values (pred-O vs pred-1) allows deriving the MV refinement (DMVR) or the prediction sample offset correction (BDOF) to be applied on the current sub-block bi-prediction samples.

In case of the local illumination change is (also) caused by illumination scene change, the hypothesis "2" is no more valid. The DMVR and BDOF processes may even degrade the bi-directional prediction accuracy. However, if WP is applied on pred-0 and pred-1 before DMVR/BDOF, it will correct the motion compensated sub-block ref-0 and the motion compensated sub-block ref-1 so that the illumination change is corrected to be same as current sub-block. Then the optical flow model becomes valid and DMVR and BDOF actually improve the prediction accuracy.

In a sixth embodiment of step 81, in order to reduce complexity, the PROF mode is disabled when WP is enabled.

In the current version of VVC as described in JVET-O2001, when WP is enabled, WP is applied before the CIIP mode blending process. In a seventh embodiment of step 81, in order to reduce complexity, the CIIP mode is disabled when WP is enabled.

In an eighth embodiment of step 81, when WP and the CIIP mode are both enabled for the current block, the regular CIIP mode is applied to the current block but the WP weights and offsets are set to defaults for the current block.

Until now, it is considered that the WP and PSW or OF tool processes are cascaded, i.e. performed sequentially. A consequence of this cascading is that if a first tool (for example WP) is applied before a second tool (for example a PSW or OF tool), the second tool is applied on the result of the first tool. In a ninth embodiment of step 81, we focus on combinations of WP and at least one PSW tool. The modification of the part of the reconstruction process of the current block related to the weighted prediction and/or to the at least one PSW tool consists in mixing the WP and PSW tool in a single weighting (blending) stage. The mixed tools could be WP and CIIP or WP and GEO or WP and TPM or WP and LIC and CIIP. It is also possible to mix PSW tools together. For example, in that case, the mixed tools are LIC and TPM or BCW and TPM or BCW and CIIP. During the mixing process, the weights and offsets of the mixed tools are combined together so that one single weighting (blending) process is applied.

PSW tools can be classified in two sub-groups: A first sub-group of PSW tools in which the offset is made after the right shift; A second sub-group of PSW tools in which the offset is made before the right shift. The first sub-group comprises the BCW mode, the CIIP mode and the bi-directional WP. The second sub-group comprises the mono-directional WP and the LIC mode.

For example, let's denote $(a_i, b_i, s_i)$ respectively the sample weight, offset and right shift values associated to a PSW tool "i" and pred(x,y) a corresponding sample prediction.

If a tool i=0 is combined with a tool 1=1, the tools "0" and "1" belonging to the first sub-group of PSW tools, the prediction sample could be obtained with the following equation:

$$pred(x, y) =$$
$$((a_0 \cdot a_1 \cdot pred_0(x, y) + a_1(b_0 \ll s_0) + (1 \ll (s_0 + s_1 - 1))) \gg (s_0 + s_1)) + b_1$$

where $pred_0(x, y)$ is a motion compensated predictor sample taken in the list L0 of reference images stored in the DPB and spatially corresponding to pred(x, y). This equation is applied when combining mono-directional WP and the LIC mode.

If the tools "0" and "1" belong to the second sub-group of PSW tools, the prediction sample could be obtained with the following equation:

$$pred(x, y) =$$
$$(a_0 \cdot a_1 \cdot pred_0(x, y) + a_1(b_0 \ll s_0) + (b_1 \ll s_0) + (1 \ll (s_0 + s_1 - 1))) \gg$$
$$(s_0 + s_1)$$

This equation is applied when combining bi-directional WP and the BCW mode or bi-directional WP and the CIIP mode or the CIIP mode and the BCW mode.

Similar equations could be derived for combinations of a tool of the first sub-group and a tool of the second sub-group and for combinations of more than two PSW tools.

For example, when combining mono-directional WP and LIC, the tool "0" being bi-directional WP and the tool "1" being LIC:

$$a_0 = LumaWeightL0[refIdxL0];$$
$$s_0 = Luma\_log2\_weight\_denom + SP;$$
$$b_0 = Luma\_offset\_L0[refIdxL0] \ll (BitDepthY - 8).$$

where the syntax elements LumaWeightL0, refIdxL0, Luma_log 2_weight_denom, Luma_offset_L0, BitDepthY are defined in JVET-O2001.

$$a_1 = a;$$
$$s_1 = shift;$$
$$b_1 = b.$$

where a, b and shift are the LIC parameters as defined above.

We described above a number of embodiments. Features of these embodiments can be provided alone or in any combination. Further, embodiments can include one or more of the following features, devices, or aspects, alone or in any combination, across various claim categories and types:

Determining if a PSW or OF tool can be applied during the reconstruction of a current block in function of an activation or a deactivation of WP.

Determining if a PSW or OF tool is replaced by an alternative inter prediction tool during the reconstruction of a current block in function of an activation or a deactivation of WP.

Determining if an application of PSW or OF tool to a current block is modified with respect to a regular application of said tool in function of an activation or a deactivation of WP.

Determining if a PSW tool and WP are merged in a single weighting stage if said PSW tool and WP are both enabled for a current block.

Determining an order of execution of WP and of a PSW or OF tool during the reconstruction of a current block.

A bitstream or signal that includes one or more of the described syntax elements, or variations thereof Inserting in the signaling syntax elements that enable the decoder to decode a CU using or not using a PSW or OF tool in a manner corresponding to that used by an encoder.

Creating and/or transmitting and/or receiving and/or decoding a bitstream or signal that includes one or more of the described syntax elements, or variations thereof A TV, set-top box, cell phone, tablet, or other electronic device that performs at least one of the embodiments described.

A TV, set-top box, cell phone, tablet, or other electronic device that performs at least one of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded video stream, and performs at least one of the embodiments described.

A TV, set-top box, cell phone, tablet, or other electronic device that receives (e.g. using an antenna) a signal over the air that includes an encoded video stream, and performs at least one of the embodiments described.

The invention claimed is:

1. A method for decoding comprising:

determining, from a video, if a group of blocks level weighted prediction mode is enabled for a current block, the group of blocks level weighted prediction mode being such that, for a current block of a group of blocks of a current picture on which is applied the group of blocks level weighted prediction mode, a residual block is based on a difference between the current block and either a weighted version of a reference block or a weighted average of a plurality of reference blocks calculated using weighting information, each reference block being extracted from a reference picture different from the current picture, the weighting information being identical for each block of the group of blocks on which is applied the group of blocks level weighted prediction mode; and responsive to the group of blocks level weighted prediction mode being enabled, modifying a part of a reconstruction process of the current block related to at least another prediction tool of a set of tools comprising a Combined Intra and Inter Prediction, or a tool in which motion information used for motion compensation is refined based on an optical flow model;

wherein the group of blocks level weighted prediction mode is enabled when a reference image providing a reference block for inter prediction of the current block is associated to a weight different from a default weight.

2. The method of claim 1, wherein the reconstruction process of the current block is modified by preventing an application of the at least another prediction tool even though syntax elements related to the at least another prediction tool indicate that the at least another prediction tool needs to be applied to the current block.

3. The method of claim 1, wherein the reconstruction process of the current block is modified by replacing an application of the at least another prediction tool to the current block specified in a video stream representative of the video by an application of an alternative inter prediction tool.

4. The method of claim 3, wherein the reconstruction process of the current block is modified by changing an interpretation of a syntax element related to the at least another prediction tool by changing a semantic of the syntax element.

5. The method of claim 1, wherein the reconstruction process of the current block is modified by changing an order of execution of the group of blocks level weighted prediction mode and of the at least another prediction tool.

6. A method for encoding comprising:

determining if a group of blocks level weighted prediction mode is enabled for a current block, the group of blocks level weighted prediction mode being such that, for a current block of a group of blocks of a current picture on which is applied the group of blocks level weighted prediction mode, a residual block is based on a difference between the current block and either a weighted version of a reference block or a weighted average of a plurality of reference blocks calculated using weighting information, each reference block being extracted from a reference picture different from the current picture, the weighting information being identical for each block of the group of blocks on which is applied the group of blocks level weighted prediction mode; and responsive to the group of blocks level weighted prediction mode being enabled, modifying a part of an encoding process of the current block related to at least another prediction tool of a set of tools comprising a Combined Intra and Inter Prediction, or a tool in which motion information used for motion compensation is refined based on an optical flow model;

wherein the group of blocks level weighted prediction mode is enabled when a reference image providing a reference block for inter prediction of the current block is associated to a weight different from a default weight.

7. A non-transitory information storage medium storing program code instructions for execution by a processor, which, when implemented, cause the processor to perform the decoding method according to claim 1.

8. A device for decoding comprising:

electronic circuitry configured to:

determine, from a video, if a group of blocks level weighted prediction mode is enabled for a current block, the group of blocks level weighted prediction mode being such that, for a current block of a group of blocks of a current picture on which is applied the group of blocks level weighted prediction mode, a residual block is based on a difference between the current block and either a weighted version of a reference block or a weighted average of a plurality of reference blocks calculated using weighting information, each reference block being extracted from a reference picture different from the current picture, the weighting information being identical for each block of the group of blocks on which is applied the group of blocks level weighted prediction mode; and modify, responsive to the group of blocks level weighted prediction mode being enabled, a part of a reconstruction process of the current block related to at least another prediction tool of a set of tools comprising a Combined Intra and Inter Prediction, or a tool in which motion information used for motion compensation is refined based on an optical flow model;

wherein the group of blocks level weighted prediction mode is enabled when a reference image providing a reference block for inter prediction of the current block is associated to a weight different from a default weight.

9. The device of claim 8, wherein the reconstruction process of the current block is modified by preventing an application of the at least another prediction tool even though syntax elements related to the at least another prediction tool indicates that the at least another prediction tool needs to be applied to the current block.

10. The device of claim 8, wherein the reconstruction process of the current block is modified by replacing an application of the at least another prediction tool to the current block specified in a video stream representative of the video by an application of an alternative inter prediction tool.

11. The device of claim 10, wherein the reconstruction process of the current block is modified by changing an interpretation of a syntax element related to the at least another prediction tool by changing a semantic of the syntax element.

12. The device of claim 8, wherein the reconstruction process of the current block is modified by changing an order of execution of the group of blocks level weighted prediction mode and of the at least another prediction tool.

13. A device for encoding comprising:

electronic circuitry configured to:

determine if a group of blocks level weighted prediction mode is enabled for a current block, the group of blocks level weighted prediction mode being such that, for a current block of a group of blocks of a current picture on which is applied the group of blocks level weighted prediction mode, a residual block is based on a difference between the current block and either a weighted version of a reference block or a weighted average of a plurality of reference blocks calculated using weighting information, each reference block being extracted from a reference picture different from the current picture, the weighting information being identical for each block of the group of blocks on which is applied the group of blocks level weighted prediction mode; and modify, responsive to the group of blocks level weighted prediction mode being enabled, a part of an encoding process of the current block related to at least another prediction tool of a set of tools comprising a Combined Intra and Inter Prediction, or a tool in which motion information used for motion compensation is refined based on an optical flow model;

wherein the group of blocks level weighted prediction mode is enabled when a reference image providing a reference block for inter prediction of the current block is associated to a weight different from a default weight.

14. A non-transitory information storage medium storing program code instructions for execution by a processor, which, when implemented, cause the processor to perform the encoding method according to claim 6.

\* \* \* \* \*